United States Patent
Maggiore et al.

(10) Patent No.: US 12,468,876 B2
(45) Date of Patent: Nov. 11, 2025

(54) METHOD FOR CONTROLLING DISSEMINATION OF INSTRUCTIONAL CONTENT TO OPERATORS PERFORMING PROCEDURES WITHIN A FACILITY

(71) Applicant: Apprentice FS, Inc., Jersey City, NJ (US)

(72) Inventors: Frank Maggiore, Jersey City, NJ (US); Angelo Stracquatanio, Jersey City, NJ (US); Obay Alchorbaji, Jersey City, NJ (US); Emilee Cook, Jersey City, NJ (US); Karl Baranov, Jersey City, NJ (US); Josh Morgan, Jersey City, NJ (US); John Zimmerman, Jersey City, NJ (US); Ahmed Bekhit, Jersey City, NJ (US); Matthew Hall, Jersey City, NJ (US); Younge Qu, Jersey City, NJ (US); Jonathan Borgia, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 272 days.

(21) Appl. No.: 18/234,808

(22) Filed: Aug. 16, 2023

(65) Prior Publication Data
US 2023/0392935 A1    Dec. 7, 2023

Related U.S. Application Data

(63) Continuation-in-part of application No. 17/968,684, filed on Oct. 18, 2022, and a continuation-in-part of
(Continued)

(51) Int. Cl.
*G06F 40/10*     (2020.01)
*G06F 3/16*      (2006.01)
(Continued)

(52) U.S. Cl.
CPC .............. *G06F 40/10* (2020.01); *G06F 3/167* (2013.01); *G06F 16/40* (2019.01); *G06F 40/166* (2020.01);
(Continued)

(58) Field of Classification Search
CPC ........ G06F 40/10; G06F 16/40; G06F 40/279; G06F 40/166; G06F 40/186; G06F 40/20; G06F 3/167; G06Q 10/06
See application file for complete search history.

(56) References Cited

U.S. PATENT DOCUMENTS 7,496,580 B2 *   2/2009   Hajdukiewicz ........ G06Q 10/06
8,977,558 B2     3/2015   Nielsen et al.
(Continued)

OTHER PUBLICATIONS

International Search Report received in PCT/US22/47048 dated May 16, 2023.
(Continued)

*Primary Examiner* — Roberto Borja
(74) *Attorney, Agent, or Firm* — Run8 Patent Group, LLC; Peter Miller

(57) ABSTRACT

A method for modifying a procedure includes: accessing an instructional block library containing a set of verified instructional blocks associated with approved digital procedures performed within a facility; accessing an unverified instructional block, authored by an operator, for a new digital procedure at the facility; detecting a set of language signals in the unverified instructional block; correlating an equipment unit language signal, in the set of language signals, with an equipment unit located within the facility; correlating an action language signal, in the set of language signals, with an action prompt related to the equipment unit; identifying a verified instructional block, in the set of verified instructional blocks in the instructional block library, as analogous to the unverified instructional block in
(Continued)

response to the verified instructional block including language signals associated with the equipment unit and the action prompt; and inserting the verified instructional block in the new digital procedure.

19 Claims, 6 Drawing Sheets

Related U.S. Application Data application No. 17/719,120, filed on Apr. 12, 2022, now abandoned, which is a continuation of application No. 16/386,178, filed on Apr. 16, 2019, now Pat. No. 11,326,886.

(60) Provisional application No. 63/399,137, filed on Aug. 18, 2022, provisional application No. 63/257,018, filed on Oct. 18, 2021, provisional application No. 62/658,562, filed on Apr. 16, 2018.

(51) Int. Cl.
| | | |
|---|---|---|
| *G06F 16/40* | (2019.01) | |
| *G06F 40/166* | (2020.01) | |
| *G06F 40/186* | (2020.01) | |
| *G06F 40/20* | (2020.01) | |
| *G06F 40/279* | (2020.01) | |
| *G06Q 10/06* | (2023.01) | |
| *G09B 5/06* | (2006.01) | |

(52) U.S. Cl.
CPC ............ *G06F 40/186* (2020.01); *G06F 40/20* (2020.01); *G06F 40/279* (2020.01); *G06Q 10/06* (2013.01); *G09B 5/065* (2013.01)

(56) References Cited

U.S. PATENT DOCUMENTS

| | | |
|---|---|---|
| 9,530,050 B1 | 12/2016 | Erol et al. |
| 10,255,573 B2* | 4/2019 | Bodnick ............... G06F 3/0484 |
| 10,956,726 B1 | 3/2021 | Quark et al. |
| 11,145,130 B2 | 10/2021 | Maggiore et al. |
| 2001/0017023 A1 | 8/2001 | Armington et al. |
| 2002/0104293 A1 | 8/2002 | Armington et al. |
| 2004/0017390 A1* | 1/2004 | Knowlton ............... G06F 9/451 |
| | | 715/202 |
| 2006/0028488 A1 | 2/2006 | Gabay et al. |
| 2007/0218432 A1 | 9/2007 | Glass et al. |
| 2008/0309463 A1 | 12/2008 | Godzwon et al. |
| 2009/0249353 A1 | 10/2009 | Siegwart |
| 2015/0039657 A1* | 2/2015 | Roth ..................... G06F 3/0484 |
| | | 707/805 |
| 2016/0027019 A1 | 1/2016 | Michaelangelo et al. |
| 2016/0162772 A1 | 6/2016 | Curtis |
| 2017/0075935 A1* | 3/2017 | Lagos .................... G06N 5/022 |
| 2017/0177807 A1 | 6/2017 | Fabian |
| 2018/0017959 A1 | 1/2018 | Pandian et al. |
| 2018/0136639 A1 | 5/2018 | Sekimoto et al. |
| 2018/0159979 A1 | 6/2018 | Amir et al. |
| 2018/0367474 A1 | 12/2018 | Santisteban et al. |
| 2019/0316912 A1 | 10/2019 | Maggiore et al. |
| 2020/0167712 A1 | 5/2020 | Stracquatanio et al. |
| 2020/0242952 A1 | 7/2020 | Clinton et al. |
| 2021/0109777 A1 | 4/2021 | Tubbs et al. |

OTHER PUBLICATIONS

Non-Final Office Action for U.S. Appl. No. 17/690,944 dated Oct. 14, 2022.
Notice of Allowanced received in U.S. Appl. No. 16/678,992 dated Dec. 2, 2021.
Office Action Received in U.S. Appl. No. 16/386,178 dated Oct. 5, 2021.

\* cited by examiner

METHOD FOR CONTROLLING DISSEMINATION OF INSTRUCTIONAL CONTENT TO OPERATORS PERFORMING PROCEDURES WITHIN A FACILITY

CROSS-REFERENCE TO RELATED APPLICATIONS

This application is a continuation-in-part of U.S. Non-Provisional application Ser. No. 17/719,120, filed on 12 Apr. 2022, which is a continuation of U.S. Non-Provisional application Ser. No. 16/386,178, filed on 16 Apr. 2019, which claims the benefit of U.S. Provisional Application No. 62/658,562, filed on 16 Apr. 2018, each of which is incorporated in its entirety by this reference.

This application is a continuation-in-part of U.S. Non-Provisional application Ser. No. 17/968,684, filed on 18 Oct. 2022, which claims the benefit of U.S. Provisional Application No. 63/257,018, filed on 18 Oct. 2021, each of which is incorporated in its entirety by this reference.

This application claims the benefit of U.S. Provisional Application No. 63/399,137, filed on 18 Aug. 2022, which is hereby incorporated in its entirety by this reference.

This application is related to U.S. Non-provisional application Ser. No. 18/204,837, filed on 1 Jun. 2023, which is incorporated in its entirety by this reference.

TECHNICAL FIELD

This invention relates generally to the field of equipment maintenance and more specifically to a new and useful method for controlling dissemination of instructional content to operators performing procedures at equipment within a facility in the field of equipment maintenance.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
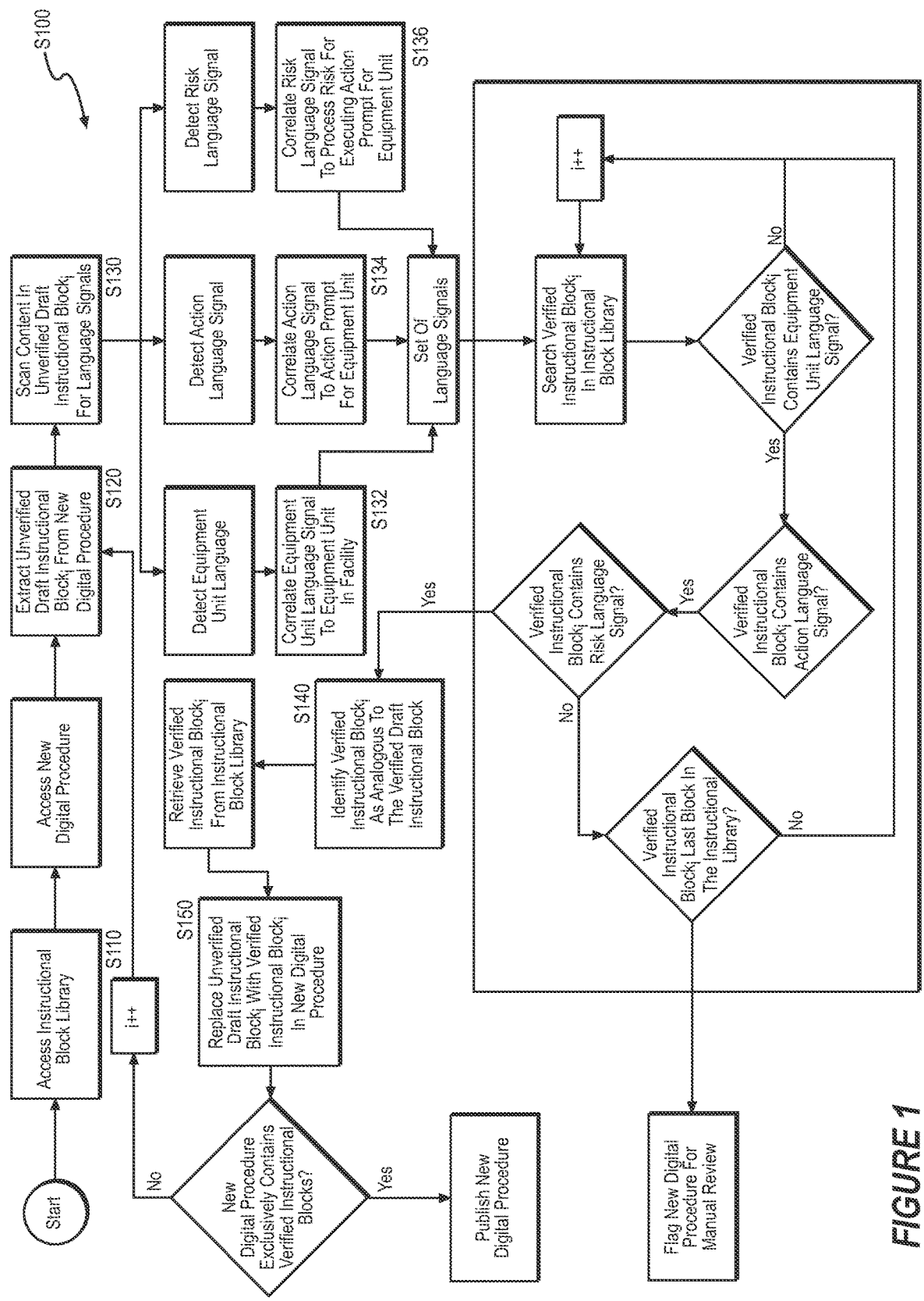
FIG. 1 is a flowchart representation of a method.
Figure 2:
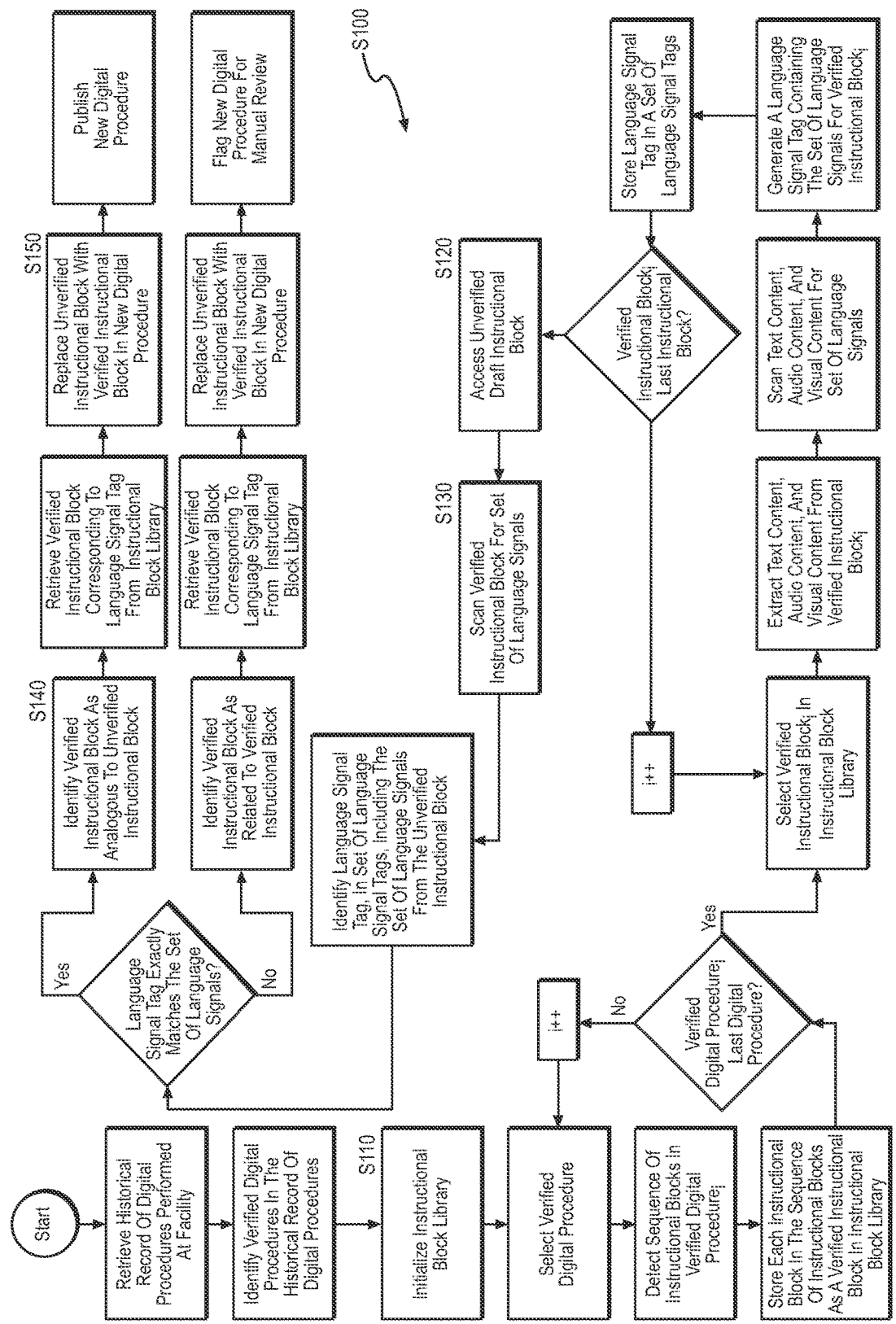
FIG. 2 is a flowchart representation of one variation of the method.
Figure 3:
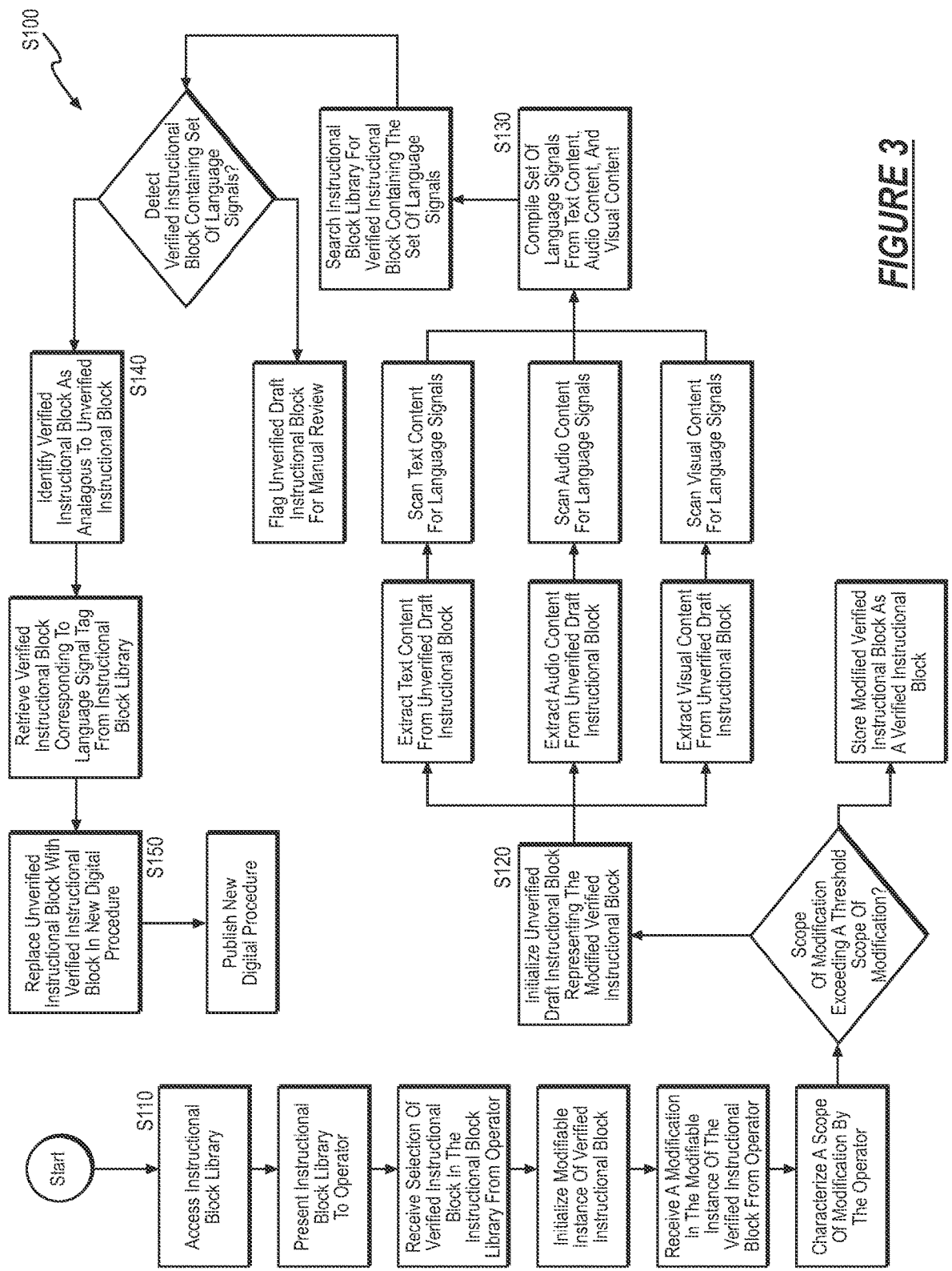
FIG. 3 is a flowchart representation of one variation of the method.
Figure 4:
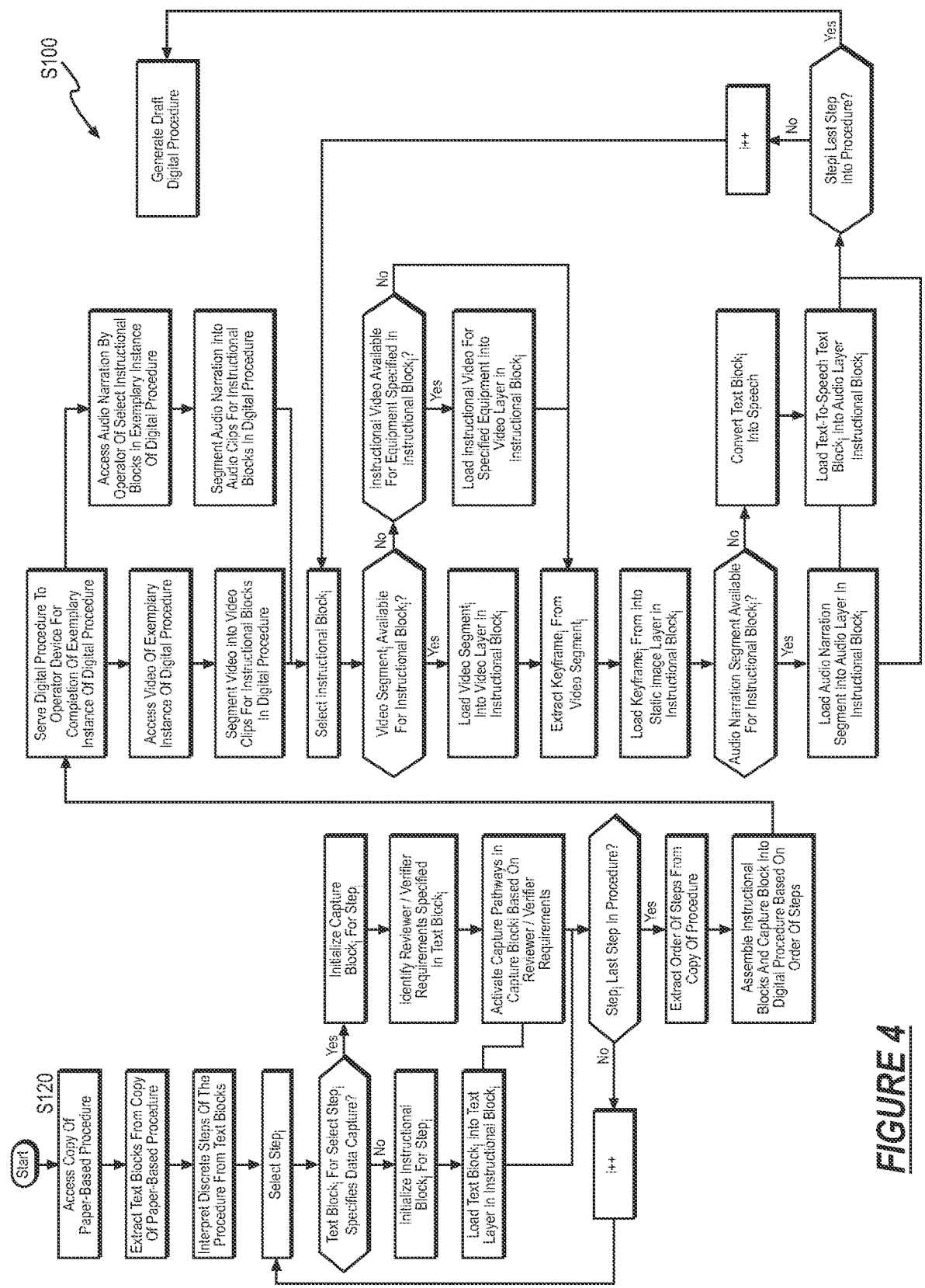
FIG. 4 is a flowchart representation of one variation of the method.

As shown in FIG. 1, a method S100 for modifying steps of a procedure includes: accessing an instructional block library containing a set of verified instructional blocks associated with approved digital procedures performed within a facility in Block S110; and accessing a first unverified draft instructional block, authored by an operator, for a new digital procedure at the facility in Block S120.

The method S100 further includes: detecting a first set of language signals in the first unverified draft instructional block in Block S130; correlating a first equipment unit language signal, in the first set of language signals, with a first equipment unit located within the facility in Block S132; correlating a first action language signal, in the first set of language signals, with a first action prompt related to the first equipment unit in Block S134; and correlating a first risk language signal, in the first set of language signals, with a first process risk associated with execution of the first action prompt with the first equipment unit in Block S136.

The method S100 also includes, identifying a first verified instructional block, in the set of verified instructional blocks contained in the instructional block library, as analogous to the first unverified draft instructional block in Block S140 in response to the first verified instructional block including language signals associated with the first equipment unit, the first action prompt, and the first process risk.

The method further includes, inserting the first verified instructional block, in place of the first unverified draft instructional block, in the new digital procedure in Block S150.

2. Applications

Generally, a computer system (e.g., a computer network) and/or a mobile device (e.g., a smartphone, tablet, augmented reality headset) can execute Blocks of the method S100 to: modify existing digital procedures representing processes currently performed at a facility containing non-networked equipment; and/or generate new digital procedures representing new processes and/or variations of previous processes derived from these existing procedures at the facility. In particular, the mobile device can access a new digital procedure—authored by an operator—that contains a sequence of unverified draft instructional blocks, wherein some or all of these blocks contain instructions for completing a specified task in multiple formats, such as: a text format; an audio format (e.g., an audio clip); a video format (e.g., a video clip); and/or a virtual format (e.g., an augmented, virtual, or mixed reality display). The mobile device can: present an unverified draft instructional block, in the sequence of unverified draft instructional blocks, to an operator, such as via an interactive display; prompt the user to modify one or more formats for an instruction within the unverified draft instructional block; and record modifications to the digital procedure at a procedure log for a current revision of the new digital procedure.

Additionally or alternatively, the system can: retrieve an instructional block library containing a list of verified instructional blocks derived from digital procedures performed at the facility; and present this instructional block library—such as at the interactive display of the mobile device—to the operator; and prompt the operator to exchange the draft unverified instructional blocks in the new digital procedure with verified instructional blocks in the instructional block library; and publish the new digital procedure exclusively containing verified instructional blocks for integration at the facility.

In one example, the computer system can: access a new digital procedure authored by an operator at the facility and representing an unverified digital procedure at the facility;

extract an unverified draft instructional block—corresponding to a particular step in a new process authored by the operator—from the new digital procedure; and scan the unverified draft instructional block for a set of language signals. For example, the computer system can scan: text content describing the step; audio content dictating the step; and visual content (e.g., video clip) depicting performance of the step in the unverified draft instructional block to detect the set of language signals. Accordingly, the computer system can then detect: an equipment unit language signal, in the set of language signals, associated with a particular equipment unit at the facility; an action language signal, in the set of language signals, associated with an action prompt related to the first equipment unit; and a risk language signal, in the set of language signals, associated with a process risk for performing the action prompt with the particular equipment unit.

The computer system can then: query the instructional block library for verified instructional blocks including the set of language signals; and identify a verified instructional block, in the set of verified instructional blocks contained in the instructional block library, as analogous to the unverified draft instructional block in response to the verified instructional block including the equipment unit language signal, the action language signal, and the risk language signal. Thus, the computer system can: insert the verified instructional block in the new digital procedure by replacing the unverified draft instructional block with the verified instructional block; and publish the new digital procedure for dissemination across a set of operator devices at the facility associated with operators assigned to perform digital procedures at the facility.

Therefore, the computer system can: transform a new digital procedure containing unverified draft instructional blocks to a published (or "approved) digital procedure exclusively containing verified instructional blocks; and expedite approval and review for the new digital procedure for execution at the facility.

3. System

Generally, Blocks of the method S100 can be executed by a system including: a computer system, such as a remote server or a computer network; and a mobile device, such as a wearable device, a smartphone, a tablet, an augmented reality headset connected to another device, or a standalone augmented reality headset. For example, the mobile device can be an augmented reality headset, including a heads-up display, eyes-up display, head-mounted display, or smart glasses configured to render augmented reality content for an operator wearing this a mobile device. Alternatively, the mobile device can include a Wi-Fi-enabled smartphone or tablet connected to a separate augmented reality device, such as a wearable device removably attachable to the operator's coveralls, clean room gowning, and/or personal protective equipment, carried in a user's hand or worn on a lanyard on the user's neck. Alternatively, a fixed and/or persistently monitoring devices within the workspace can be deployed to support the operators performing procedures.

Furthermore, the mobile device can include: a suite of sensors configured to collect information about the mobile device's environment; local memory and/or cloud memory configured to temporarily store a localization map of a room; a display; a speaker or audio jack; and a controller configured to determine a location of the mobile device in real space, such as based on the localization map and data collected by the suite of sensors. For example, the mobile device can include: a depth camera paired with a 2D color camera; or a pair of stereoscopic 2D color cameras. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the pose of the mobile device within the room.

However, the mobile device can include any other type of sensor in any other quantity and can implement any other method or technique to calculate its pose within a room based on a localization map of the room and data recorded by these sensors.

4. Generating the Digital Procedure

In one variation, the method S100 includes: at the computer system, accessing an electronic document for a procedure in a facility; and identifying a sequence of steps specified in the electronic document. This variation of the method S100 also includes, for each step in the sequence of steps: extracting an instruction in the text format, corresponding to a first degree of guidance, for the step; initializing a block, in a set of blocks, for the step; and populating the block with the instruction in the text format for the step. This variation of the method S100 further includes, for a first step, in the sequence of steps, including a first instruction in the text format: accessing the first instruction depicted in a second format corresponding to a second degree of guidance different from the first degree; and accessing the first instruction depicted in a third format corresponding to a third degree of guidance greater than the first degree and the second degree. Furthermore, this variation of the method S100 includes: compiling the set of blocks into the digital procedure according to an order of the sequence of steps defined in the electronic document; appending a first block, in the digital procedure, corresponding to the first step with the first instruction depicted in the second format and the first instruction depicted in the third format; setting a minimum instruction guidance specification, defining a minimum degree of guidance for the first instruction, for the first block; and serving the digital procedure to a mobile device for presentation of instructions in the set of blocks to a user, in the facility, in formats specified by a minimum instruction guidance specification.

Generally, in this variation, the computer system can: ingest a paper-based procedure; identify steps in the paper-based procedure; extract instructions (e.g., text-based instructions) for steps in the paper-based procedure; aggregate other supportive content for these steps, such as in the form of images, audio, video, or augmented reality content; compile these data into individual instructional blocks containing instructions in different formats corresponding to different levels of human-targeted guidance; and then order these individual blocks or define a pathway for these individual blocks (in a decision tree) to generate a new digital procedure. Upon receipt of this digital procedure, a mobile device can execute Blocks of the method S100 to serve instructions in each block in the digital procedure to a user in select formats according to a current minimum instruction guidance specification for the digital procedure, assigned the individual user, or assigned globally to all users in the facility.

4.1 Text Format

In one implementation, an administrator affiliated with the facility loads an existing paper copy of a document outlining steps of a procedure for a machine in the facility into an administrator portal—hosted by the computer system—to create a digital form of this procedure. For example, the administrator can scan the paper copy of the document with a smartphone, tablet, or dedicated scanner; alternatively, the administrator can directly access a digital (e.g., vectorized, digitized) copy of this document.

The administrator portal can then interface with the administrator to: highlight a procedure identifier in the copy of the document, such as a QR code, barcode, alphanumeric procedure identifier and revision number, or textual description of the procedure; and link this procedure identifier to a particular machine, type or class of machine, or configuration of machine in the facility and/or to a particular location, room, or area inside the facility. For example, the administrator can select each machine, machine type or class, or machine configuration from a dropdown menu—rendered in the administrator portal—of all machines in the facility and/or select a machine or location within the facility from a map (e.g., a plan map, or a 3D localization map) of the facility—rendered in the administrator portal—to link to this procedure identifier. The administrator portal can similarly interface with the administrator to link support equipment, such as a scale, to this procedure identifier.

The computer system can then implement text recognition, natural language processing, or other textual analysis or computer vision techniques to: detect breaks or textual indicators between consecutive steps in the process outlined in the document; extract textual descriptions and textual instructions for each of these steps; and distinguish instructional steps from data capture steps in this process based on these textual descriptions and/or instructions.

The computer system can then initialize one instructional block per instructional step thus identified in this process. For example, a generic instructional block can include multiple instructional layers, wherein each instructional layer is configured to store instructional content in one format, such as: text; audio; images or graphics (e.g., static images); video; prerecorded augmented reality content; responsive augmented reality content; and prerecorded or localized 3D content. For each instructional step thus identified in this process, the computer system can populate a first text layer in the corresponding instructional block with the textual description and/or textual instruction extracted from the corresponding step in the document outlining the process.

4.2 Audio Format

For each instructional step thus identified in this process, the computer system can also populate a second audio layer in the corresponding instructional block with an audio clip describing the corresponding step in the process.

In one example, for a particular instructional block in the digital procedure, the computer system can: implement text-to-speed methods to transform a text-based instruction—in the instructional block—into an audio clip of an automated voice reciting the text-based instruction; and then store this audio clip (i.e., the instruction in the audio format) in the audio layer of the particular instructional block. The computer system can repeat this process to automatically generate audio clips for other instructional blocks describing steps in the process.

Additionally or alternatively, the computer system can: interface with the administrator—via the administrator portal—to record audio clips of the administrator reciting instructional content related to these instructional blocks; and then store these audio clips in audio layers of the corresponding instructional blocks. However, the computer system can implement any other method or technique to access or generate audio content for audio layers in instructional blocks thus generated for this process.

4.3 Visual Format

The computer system can implement similar methods and techniques to extract graphics or other static visual content from the document outlining the procedure and/or access static visual content selected or uploaded by the administrator via the administrator portal. The computer system can then store this visual content in static visual content layers in corresponding instructional blocks for this process.

4.4 Video Format

The computer system can also populate video layers in all or select instructional blocks with video content (or "video clips").

In one implementation, after initializing the digital procedure with instructional blocks containing low-level guidance content extracted from the paper document outlining the procedure (and after inserting capture blocks into the digital procedure, etc. as described below), the computer system can serve the digital procedure to a mobile device associated with the administrator or other well-trained operator in the facility for completion of an initial (or "exemplary") instance of the new digital procedure. While the administrator or operator performs this first instance of the new digital procedure at a machine in the facility, the mobile device can record a video of this initial instance of the digital procedure, timestamp frames in this video, and tag these frames or video snippets with identifiers of concurrent instructional blocks in the digital procedure. The computer system can then: segment the video of this initial instance of the digital procedure into a set of video clips—each corresponding to one instructional block—based on these tags; and then load a video clip into the video layer in a corresponding instructional block in the digital procedure for all or a subset of these instructional blocks.

In another implementation, the computer system can interface with the administrator via the administrator portal to access prerecorded instructional videos for machines and equipment specified in the document and load these videos directly into video layers in corresponding instructional blocks in the digital procedure. Additionally or alternatively, the computer system can: implement natural language processing or other techniques to isolate words or phrases corresponding to equipment or specific processes specified within a step in the document; automatically retrieve video content related to these words or phrases; and then load this video content directly into a video layer of the corresponding instructional block in the digital procedure. For example, the computer system can detect a make and model number of a particular machine specified in a step in the process, search a database for a video described basic operation of this make and model number of the machine, and then download or link this video to the video layer in the corresponding instructional block. In this example, the computer system can also isolate a particular action at this make and model number of machine (e.g., "tare scale model X by manufacturer Y"), retrieve a video depicting this particular action at this make and model number of machine (e.g., a video entitled "how to tare scale model X by manufacturer Y"), and then download or link this video to the video layer in the corresponding instructional block.

The computer system can: implement similar methods and techniques to retrieve diagrams (i.e., static image or graphics) for particular equipment or equipment-specific action specified in steps outlined in the document; and then store these diagrams in static image layers in corresponding instructional blocks in the digital procedure. Additionally or alternatively, the computer system can implement similar methods and techniques to retrieve video clips describing operation or actions at particular equipment or equipment-specific action specified in steps outlined in the document; extract audio snippets from these video clips (or from video segments recorded during the initial instance of the digital procedure); and then store these audio snippets in audio layers in corresponding instructional blocks in the digital procedure. The computer system can implement similar methods and techniques to generate augmented reality overlays for instructional blocks from video recorded during the initial instance of the digital procedure, load augmented reality overlay content supplied by the administrator via the administrator portal, and/or retrieve augmented reality overlay data from an external database and then store these augmented reality overlay content in augmented reality layers in corresponding instructional blocks in the digital procedure.

The computer system can also: access audio and/or visual data collected during subsequent instances of the digital procedure by the same operator or other users in the facility over time; extract audio, video, augmented reality, or other visual content from these audio and/or visual data; and update layers in instructional blocks in the digital procedure based on these new data.

4.5 Capture Blocks

The computer system can also generate one capture block per capture step in the process. For example, a capture block can similarly includes multiple capture layers, wherein each capture layer is configured to record data in one format or through one pathway, such as: manually-entered text; manually-entered numerical data; an image; a video; text or numerical data extracted automatically from an image or video feed recorded by a user's mobile device; etc.

In one implementation, the computer system interfaces with the administrator via the administrator portal to specify data input regions in this digital copy of the document. For example, the administrator can highlight input fields specifying manual recordkeeping in the document, such as a line or box for recording a weight, pressure, temperature, density, or composition value read from a scale or dial on a machine or for recording a textual note. The administrator can then link each region of interest in the document to a primary data type or data class, such as manual text or numerical entry, manual audio or visual capture, or automated audio or visual capture. The administrator can also specify secondary and/or tertiary capture for a particular capture block, such as manual numerical entry as a primary data type augmented with automated video capture and automated numerical value extraction from captured video to verify manual numerical entry. The computer system can define and selectively enable layers in each capture block in this digital procedure according to such input from the administrator.

4.6 Digital Procedure Assembly

The computer system can similarly retrieve blocks of other types—such as described below—and populate these blocks with data extracted from the document and/or with data entered by the administrator. The computer system can then order these blocks according to the sequence of steps outlined in the document and assemble these blocks into one new digital procedure accordingly.

However, the computer system can implement any other method or technique to generate a digital procedure.

4.7 Instructional Block Formats

Therefore, the computer system can aggregate instruction data in different formats—such as in textual, static image or graphical, audio, video, prerecorded augmented reality, and/or responsive augmented reality formats—for each instructional block in the digital procedure. The computer system can also assign a guidance value to each instruction format in an instructional block.

In one implementation, the computer system implements a preset guidance scale in which instruction formats are ranked, in increasing order of guidance level, from textual format to graphical format, then audio format, static image format, video format, prerecorded augmented reality format, and/or finally responsive augmented reality format.

For example, the digital procedure can contain a sequence of instructional blocks including the first instructional block describing a first instruction in the set of formats including: a text format including a textual description of a first process step in the digital procedure (e.g., extracted directly from the paper-based document outlining the procedure) and characterized by a first degree of guidance; an audio format including an audio recording of a (real or automated) voice describing the first process step and characterized by a second degree of guidance greater than the first degree; a visual format including a video clip depicting performance of the first process step (e.g., recorded during an "exemplary" instance of the digital procedure or including a technical manufacturer's video describing operation of its equipment) and characterized by a third degree of guidance greater than the second degree; and an augmented reality overlay (generated based on manual augmentation of a video of an "exemplary" instance of the digital procedure) corresponding to a fourth degree of guidance greater than the third degree; etc.

Alternatively, the administrator can manually label guidance levels for each format in an instructional block, and the computer system can rank or sort these instruction formats within an instructional block accordingly.

5. Loading Digital Procedure

One variation of the method S100 recites, at a mobile device associated with a user, accessing a digital procedure containing a first instructional block, the first instructional block including a first instruction in a set of formats including: a text format corresponding to a first degree of guidance; an audio format corresponding to a second degree of guidance different from the first degree; and a visual format corresponding to a third degree of guidance greater than the first degree and the second degree. Generally, a mobile device assigned to or carried by a user can access a digital procedure in preparation for the user performing a next instance of the digital procedure.

In one implementation, a user's mobile device automatically initializes a new digital procedure based on proximity of the mobile device to a machine, equipment, or location scheduled for the corresponding procedure. In this implementation, the mobile device can track its location and orientation within the facility. As the user approaches the machine in preparation for performing this procedure, the mobile device—worn or carried by the user—can track its location within the facility and identify a particular machine with which the user is interfacing based on this location. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the space occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or a computer system) can then query a map of machines throughout the facility for a particular machine adjacent and facing the mobile device—and therefore the user—based on the position and orientation of the mobile device in real space. Alternatively, the mobile device can identify the particular machine directly by matching a constellation of features detected in images recorded by the camera to a known, unique constellation of features associated with this particular machine.

The mobile device can regularly execute this process to monitor its position and orientation within the facility and detect machines nearby. Then, when the user stops for more than a threshold duration of time (e.g., ten seconds) or when the mobile device determines that its location has moved less than a threshold distance within a period of time (e.g., one meter in ten seconds), the mobile device can: query the digital procedure database for a digital procedure associated with a machine nearest the current position of the mobile device; and automatically load an instance of this digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the user to select from the list; and download an instance of a particular digital procedure associated with a machine selected by the user. For example, the mobile device can: track its location within the facility; detect a set of machines nearby based on a map of the facility and the location of the mobile device within the facility; retrieve a list of digital procedures associated with this set of machines; render this list of digital procedures on a display of the mobile device; download a particular digital procedure from a database (e.g., a remote server via a wireless network) in response to the user selecting this particular digital procedure from the list of digital procedures; and then initialize a new, local instance of the particular digital procedure accordingly at the mobile device.

Alternatively, the user can manually select (or "pull") the particular machine directly from a dropdown list of machines or select the particular digital procedure directly from a dropdown list of digital procedures for all machines and equipment in the facility. The mobile device can then initialize a new, local instance of this digital procedure selected manually by the user.

However, the mobile device can implement any other method or technique to access a digital procedure and initialize a new, local instance of the digital procedure.

6. Minimum Instruction Guidance Specification

One variation of the method S100 recites accessing a minimum instruction guidance specification assigned to the user for a current instance of the digital procedure at the mobile device. Generally, the mobile device can retrieve a minimum instruction guidance specification for a particular instructional block in the digital procedure, a particular type of instructional block in the instructional block, or the digital procedure as a whole.

In one implementation, the computer system implements methods and techniques described below to set minimum instruction guidance specifications: specifically for the user currently carrying the mobile device; for a group of similar users in the facility; and/or for all operators within the same team, group, building, facility, department, site, company, or regulated environment. The computer system can store these minimum instruction guidance specifications—linked to individual user, team, group, building, facility, department, site, and/or company identifiers—in a remote database. The computer system can also regularly update these minimum instruction guidance specifications based on results of digital procedures completed by these operators and/or responsive to digital procedure revisions.

Thus, when the user's mobile device initializes a new, local instance of a digital procedure, the mobile device can also return a query for current minimum instruction guidance specification for this instance of the digital procedure—to the computer system or remote database—based on the user's identifier and the digital procedure. The mobile device can then implement the minimum instruction guidance specification(s) returned by the computer system or remote database to selectively serve instructions to the user in formats that fulfill the minimum instruction guidance specification(s) during execution of this current instance of the digital procedure.

7. Default Instruction Format

One variation of the method S100 recites, in response to initiation of the first instructional block in the digital procedure, presenting the first instruction in a particular format, in the set of formats, corresponding to a particular degree of guidance approximating the minimum instruction guidance specification. Generally, when the user enters an instructional block in the current instance of the digital procedure at the mobile device, the mobile device can: access a minimum instruction guidance specification for this block and for this user; identify a particular instruction format—in a set of instruction formats contained in layers in this block—that fulfills this minimum instruction guidance specification; and then present the instruction for this block in the particular instruction format to the user via a display or speaker in the mobile device or in a connected device.

The method S100 can also recite presenting the first instruction in a second format, in the set of formats, corresponding to a degree of guidance greater than the particular degree in response to selection of additional guidance for the first instruction. Generally, the mobile device can serve instructional content—corresponding to higher levels of guidance than specified in the minimum instruction guidance specification—to the user during the current instructional block in the digital procedure responsive to inputs from the user.

In one implementation, the computer system defines a minimum instruction guidance specification in the form of a particular instruction format, such as one of: text; static images or graphics; audio; video; prerecorded augmented reality; or responsive augmented reality. For example, if the computer system previously set a minimum instruction guidance specification of "audio format" for the current instructional block in the current instance of the digital procedure performed by the user, the mobile device can serve the instruction for this instructional block to the user in the audio format by default. As described below, the mobile device can then enable the user to elect other instruction formats corresponding to higher guidance levels, including: enabling the user to elect the video, prerecorded augmented reality, and/or responsive augmented reality formats in place of the audio format; and preventing the user from accessing the text, static image, and static graphic formats exclusive of the audio format. In this example, the mobile device can also enable the user to access the text, static image, and/or static graphic formats for this instructional block only if the audio format is also replayed, such as: during replay of the audio clip for this instructional block; or only after this audio clip is replayed in its entirety. For example, the mobile device can automatically render the instruction for the current instructional block in the text, static image, and/or static graphic formats on its integrated display or enable the user to index between these lower-guidance formats while the mobile device serves the instruction for the current instructional block in the audio format (e.g., by replaying the audio clip for this instructional block).

In a similar example, if the computer system previously set a minimum instruction guidance specification of "video format" for the current instructional block in the current instance of the digital procedure performed by the user, the mobile device can serve the instruction for this instructional block to the user in the video format by default. As described below, the mobile device can then enable the user to elect other instruction formats corresponding to higher guidance levels, including: enabling the user to elect the prerecorded augmented reality and/or responsive augmented reality formats in place of the video format; and preventing the user from accessing the text, static image, static graphic formats, and audio format exclusive of the video format. In this example, the mobile device can also enable the user to: access the text, static image, and/or static graphic formats for this instructional block after the mobile device has fully replayed a video clip in the current instructional block; or open these lower-guidance instruction formats in real-time during replay of this video clip.

Therefore, in the foregoing example, the computer system can set a minimum instruction guidance specification defining a particular degree of guidance corresponding to an audio format for an instructional block in the current instance of the digital procedure. The mobile device can then play back an audio recording in this instructional block by default according to the minimum instruction guidance specification in response to initiation of the instructional block in the current instance of the digital procedure. During playback of the audio recording, the mobile device can also enable selection of further guidance for the instruction from the user; responsive to selection of further guidance for the first instruction, the mobile device can then playback a video clip for the instructional block. If the user again elects further guidance for the instruction, the mobile device can then render an augmented reality overlay—aligned to features on a machine proximal the user—on a display of the mobile device or serve this augmented reality overlay to an eyes-up display worn by the user.

In another implementation, the computer system defines a minimum instruction guidance specification in the form of a quantitative or qualitative value, such as: on a scale from 0 to 100; or according to very low, low, moderate, high, and very high guidance descriptors. In this implementation, the computer system can also interface with an administrator to ascribe quantitative or qualitative guidance values to layers in instructional blocks in a digital procedure. For example, for a first instructional block describing taring a scale, the computer system can record moderate (or "68/100") guidance for instruction in a text format, high guidance (or "84/100") for instruction in a static graphic format, and very high guidance (or ">92/100") for instruction in audio, video, and augmented reality formats. In this example, for a second instructional block describing a time-sensitive sequence of steps for mixing compounds of carefully-controlled amounts at a machine, the computer system can record very low guidance (or "25/100") for instruction in a text format, low guidance (or "37/100") for instruction in a static graphic format, and moderate guidance (or "55/100") for instruction in an audio format, high guidance (or "81/100") for instruction in a video format, and very high guidance (or ">90/100") for instruction in an augmented reality format. In this example, if the computer system assigns a "moderate" minimum instruction guidance specification to the user for the current instance of the digital procedure, the mobile device can present instruction in the first instructional block to the user in the text format and present instruction in the second instructional block to the user in the audio format. Alternatively, if the computer system assigns a minimum instruction guidance specification of "60/100" to the user for the current instance of the digital procedure, the mobile device can present instruction in the first instructional block to the user in the text format and present instruction in the second instructional block to the user in the video format. The mobile device can then enable the user to elect instructional formats corresponding to higher levels of quantitative or quantitative guidance.

7.1 Manual Selection v. Minimum Instruction Guidance Specification

In one variation, the mobile device (or the computer system) can: track request for higher-guidance instruction format entered by the user over time, such as during previous blocks in the current instance of the digital procedure, during previous instances of the same digital procedure, or during previous instances of any other digital procedure in the facility; and predict the user's preferences for formats for consuming instructions within instructional blocks. The mobile device can then: selectively serve instructions in instructional blocks in the current instance of the digital procedure to the user in the user's preferred format if this preferred format corresponds to a level of guidance greater than or equal to the minimum instruction guidance specification for this instructional block, for this digital procedure, or for this user; and otherwise serve these instructions in formats specified by the minimum instruction guidance specification.

For example, the mobile device can record a user-elected format, in a set of formats supported within a particular instructional block, selected by the user when viewing the particular instructional block during the current instance of the digital procedure. During a next instance of the digital procedure at the mobile device, the mobile device can access an updated minimum instruction guidance specification assigned to the user—by the computer system, as described below—for this next instance of the digital procedure. In response to initiation of the particular instructional block during this next instance of the digital procedure, the mobile device can: present the instruction in the particular instructional block in a format corresponding to a degree of guidance specified in the updated minimum instruction guidance specification if the user-elected format corresponds to a degree of guidance less than the updated minimum instruction guidance specification; or present the instruction in the particular instructional block in the user-elected format if the user-elected format corresponds to a degree of guidance greater than the updated minimum instruction guidance specification.

The mobile device can implement similar methods and techniques to feed guidance or instruction format selections made by the user forward to next instructional blocks in the same instance of the digital procedure. The mobile device can also implement guidance or instruction format preferences set manually by the user, such as in a user profile, and then implement similar methods and techniques to selectively serve instructions in user-preferred formats if these formats meet or exceed the minimum instruction guidance specification assigned to the user.

8. Next Block

One variation of the method S100 recites initiating a second block in the digital procedure in response to completion of the first instructional block. Generally, the mobile device can initiate a next block in the digital procedure—such as a next instructional block or a capture block—upon completion of the preceding instructional block in the digital procedure. For example, the mobile device can complete a first instructional block in the digital procedure and initiate a second block in the digital procedure in response to: completion of an audio, video, or augmented reality clip in the first instructional block; manual confirmation from the user to move to the next block; manual entry or automatic capture of a value instructed in the first instructional block; or a change in location or orientation of the mobile device that indicates completion of the first instructional block. The mobile device can then repeat the foregoing methods and techniques to serve instructions in the next instructional block to the user according to a minimum instruction guidance specification or implement methods and techniques described below to guide the user through a capture block.

(Furthermore, to move to a next block in the digital procedure, the user can confirm that the current block in the digital procedure is completed. While the mobile device can enable the user to repeat the current block of the digital procedure, the mobile device can also store timestamped information captured during the first instance of the current step in an audit-trail log and can prioritize data captured during a most-recent version of the current step—completed by the user during this instance of the digital procedure—in the audit-trail log. Additionally, the next instructional block can be linked to another module in the same or other digital procedure. In one example, in which the user drops a filter and in which this error is linked to a secondary module in the same digital procedure, the mobile device can serve a standard sequence of blocks—excluding this secondary model—in this digital procedure to the user by default but then selectively serve blocks in the secondary module to the user only in instances in which the user indicate manually that she dropped the filter or in which the mobile device automatically detected the dropped filter.)

9. Capture Block

In one variation, the mobile device implements similar methods and techniques to enforce pathways for capturing data in capture blocks within the digital procedure.

In one implementation, the computer system initializes a capture block for recordation of data and incorporates this capture block in a digital procedure based on steps in a process outlined in a paper document, as described above. For example, the capture block can define a set of layers for data capture, including: manual numerical entry; manual text entry; manual selection from a prepopulated list of values; manual image capture at the mobile device; manual video capture; automatic image capture; automatic video capture; and automatic value (e.g., numerical value) capture from a static image or video stream. The computer system can thus interface with an administrator to selectively enable these data capture layers in the capture block. Alternatively, the computer system can automatically enable these data capture layers in the capture block based on data verification or validation requirements outlined in the document. For example, the computer system can specify both manual data entry and automatic data capture (e.g., an image or video) with automatic data extraction (e.g., extraction of a numerical value from an image or video) for a step designating supervisor verification in the document. The computer system can store minimum types or combinations of these data capture pathways in a capture mode specification for the particular data capture block, for data capture blocks of this type, for the digital procedure, or for a particular user, etc. Later, when the mobile device initializes the current instance of the digital procedure and then initiates this data capture block, the mobile device can: access the capture mode specification assigned for the digital procedure; and then prompt the user to record data in select capture formats—in the set of capture formats enabled in the data capture block—based on this capture mode specification.

Additionally or alternatively, the computer system can implement methods and techniques described below to define a capture mode specification for the particular data capture based on historical results of digital procedures completed in the facility over time. For example, the computer system can define redundant data capture pathways for data capture blocks, including (in order of increasing automation and reduced operator autonomy): manual data entry with manual verification via a digital image of a machine or process recorded manually by a user; manual data entry with manual verification via a digital image of a machine or process recorded automatically by a mobile device; manual data entry with automatic verification via a digital image of a machine or process recorded manually by a user; manual data entry with automatic verification via a digital image of a machine or process recorded automatically by a mobile device; and automatic data extraction and verification via a sequence of digital images recorded automatically by a mobile device. Thus, for a data capture block that specifies input of a numerical value, the computer system can assign a capture mode specification that defines increased automation and reduced operator autonomy proportional to a rate of error in manual entry of numerical values by operators during past instances of digital procedures in the facility. During the current instance of this digital procedure, the mobile device can guide the user in capturing data according to this capture mode specification, such as by prompting the user to enter a numerical value, record an image or video, and/or point the mobile device toward a particular machine or equipment to enable the mobile device to automatically capture an image or video and extract data from this image or video accordingly.

The computer system can also update the capture mode specification for this capture block in the digital procedure over time. For example, the computer system can: access an historical record of instances of the digital procedure performed previously by the user; detect errors related to the capture block during instances of the digital procedure performed previously by the user based on the historical record; and then refine the capture mode specification for the user to specify a quantity of capture formats for the capture block in the current instance of the digital procedure proportional to a rate of errors related to the capture block during previous instances of the digital procedure performed by the user. The computer system can similarly revise the capture mode specification for this capture block based on results from instances of the digital procedure performed by other operators in the facility, such as including: specifying more manual and automated capture pathways for greater redundancy responsive to increased data capture or process errors, which can reduce longer-term error rates; specifying fewer manual and automated capture pathways for less redundancy responsive to low or decreased data capture or process errors; and specifying one manual and automated capture pathway only for no redundancy responsive to low or null rates of data capture or process errors in order to reduce digital procedure durations and increase operator autonomy.

Additionally or alternatively, an instructional block can include a capture component, and the computer system can implement similar methods and techniques to define both a minimum instruction guidance specification and a capture mode specification for this instructional block. The mobile device can then implement methods and techniques described above to enforce both the minimum instruction guidance specification and the capture mode specification during this instructional block in a next instance of the digital procedure performed by a user.

10. Modifiable Digital Procedure

One variation of the method S100 recites: at a computing device associated with an operator, accessing a modifiable digital procedure containing a first instructional block, the first instructional block including a first instruction. In this variation, a mobile device assigned to and/or carried by an operator can access a digital procedure in preparation for the operator to modify a current instance of the digital procedure. In this variation, a modifiable digital procedure can be a procedure that is currently being authored or currently under review but not in approved state where it has been signed-off on or validated for processing. Furthermore, a modifiable digital procedure can alternatively be pending review for a regular review cycle period (i.e., every two years) or after a deviation event for the digital procedure takes place where the procedure is re-examined after an event takes place.

In one implementation, an operator's mobile device automatically initializes a new digital procedure based on proximity of the mobile device to an operator cell and/or equipment unit for the corresponding procedure. In this implementation, the operator performs a current instance of the digital procedure at the operator cell deviating from previous instances of the digital procedure. The mobile device can track its location and orientation within the facility. As the operator approaches the operator cell in preparation for performing this procedure, the mobile device—worn or carried by the operator—can track its location within the facility and identify a particular operator cell with which the user is interfacing based on this location. In response to identifying this particular operator cell within the facility, the mobile device can then access a modifiable instance of the digital procedure.

In one example, the mobile device can: identify a particular assembly cell proximal to the operator; access a list of operators associated with a particular assembly cell; and query the list of operators for approved operators granted permissions to modify current instances of the digital procedure. In response to locating an approved operator—in the list of operators—to modify the digital procedure, the mobile device can then load a modifiable instance of the digital procedure for the operator and present the digital procedure to the operator via an integrated display on the mobile device. The operator can then—at the mobile device—modify instructional blocks in the digital procedure, such as by modifying text, capturing media, video editing, modifying value ranges etc. The computer system can then concurrently record these modifications to the digital procedure in a procedure log for the current instance of the digital procedure indicating the modifications performed by the operator.

Therefore, the computer system can: transmit this modified digital procedure including the procedure log to a supervisor device associated with a supervisor; and queue the modified digital procedure at the supervisor device for approval, thereby expediting approval of alternative versions of digital procedures performed within the facility. Alternatively, the computer system can transmit the modified digital procedure and the procedure login to the supervisor device in real-time, thereby enabling the supervisor to observe changes to the digital procedure as the operator performs the current instance of the digital procedure.

Alternatively, the digital procedure can be performed by a contract manufacturing organization for a client, the supervisor can be external to the organization manufacturing the product, where the supervisor at a client company will need to provide approval for the changes made to the digital procedure through the platform securely.

In another implementation, the operator can selectively load a modifiable digital procedure to the operator's corresponding mobile device based on an operator profile associated with the operator in order to perform a current instance of the digital procedure that deviates from previous instances of the digital procedure. In this implementation, the operator profile can indicate permissions for the operator to modify digital procedures carried out within the facility. The operator can then approach a particular operator cell and/or particular equipment unit within the facility. The computer system can then: serve the operator with a list of approved digital procedures performed at the facility in response to authenticating operator permissions in the operator profile; and, in response to receiving selection of a digital procedure in the list of approved digital procedures, load a modifiable digital procedure associated with the particular operator cell and/or equipment unit.

In one example, the computer system can: locate the operator in a particular testing lab within the facility; access an operator profile associated with the operator and containing a list of permissions; query the list of permissions to locate modifying permissions in the list of permissions; and serve a prompt to the operator to select a digital procedure from a set of digital procedures associated with the facility in response to locating the operator in the testing lab within the facility and authenticating operator permissions in the operator profile. The computer system can then confirm selection of a particular digital procedure in the set of digital procedures from the operator and load a modifiable version of the particular digital procedure. Therefore, the computer system can enable operators to selectively load currently approved digital procedures performed within the facility in order to modify these currently approved digital procedures to generate new digital procedures at the facility.

In yet another implementation, the computer system can access a modifiable digital procedure for multiple operators within the facility in order to cooperatively modify a current instance of the digital procedure. In one particular workflow, a conductor in the facility can—in real-time—modify a current instance of the digital procedure via a conductor device associated with the conductor. The computer system can then: transmit—in real-time—this modified digital procedure to an operator device associated with the operator; and serve guidance to the operator for performing this modified digital procedure.

11. Instructional Block Library

Blocks of the method S100 recites, accessing an instructional block library containing a set of instructional blocks associated with approved digital procedures performed within the facility in Block S110. Generally, the mobile device can retrieve the instructional block library in preparation for modification of a current instance of a digital procedure.

In one implementation, the computer system can: access a geospatial location of the mobile device; identify a facility containing the geospatial location of the mobile device; automatically retrieve the instructional block library, such as from a remote computer system; and load the instructional block library at the mobile device for presentation to the operator. Furthermore, during performance of a modifiable digital procedure, the computer system can then automatically and/or selectively: replace instructional blocks in a current instance of the digital procedure with instructional blocks from the instructional block library; and/or add instructional blocks retrieved from the instructional block library to the current instance of the digital procedure.

For example, the mobile device can: retrieve a modifiable digital procedure containing a particular set of instructional blocks; retrieve the instructional block library containing sets of approved instructional blocks performed within the facility including the particular set of instructional blocks for the modifiable digital procedure; and present the modifiable digital procedure and these sets of instructional blocks to the operator, such as via a digital display at the mobile device associated with the operator during performance of the modifiable digital procedure. In this example, the computer system can: in response to initializing a first instructional block in the modifiable digital procedure, present a list of alternative instructional blocks for the first instructional block defined in the instructional block library to the operator; and receive confirmation of selection—by the operator at the mobile device—for an alternative instructional block from the list of alternative instructional blocks presented to the operator. The computer system can then: modify the current instance of the modifiable digital procedure to replace the first instructional block with the alternative instructional block selected by the operator; and record this modification in a procedure log for this modifiable digital procedure.

In another example, the computer system can: retrieve a modifiable digital procedure containing a particular set of instructional blocks; receive a selection—by the operator at the mobile device—to remove one or more instructional blocks in the particular set of instructional blocks for the modifiable digital procedure; and present this modified digital procedure to the operator at the mobile device. Additionally, the computer system can: retrieve the instructional block library containing sets of approved instructional blocks performed within the facility; and present the instructional block library to the operator at the mobile device. The computer system can then: receive selection of one or more instructional blocks from the instructional block library by the operator at the mobile device; and load these instructional blocks from the instructional block library to the current instance of the digital procedure. Furthermore, the computer system can: modify an order of these instructional blocks in the modified digital procedure upon selection from the operator; and generate a new digital procedure containing instructional blocks from the retrieved digital procedure and instructional blocks retrieved from the instructional block library; and transmit this new digital procedure to a supervisor for approval and/or review.

Therefore, the computer system can: modify a current instance of the digital procedure with instructional blocks from the instructional block library; generate a new digital procedure based on instructional blocks within the current instance of the digital procedure and approved instructional blocks retrieved from the instructional block library; and thereby expediting the approval process of this new digital procedure by implementing these facility approved instructional blocks from the instructional block library.

11.1 Generating the Instructional Block Library

In one implementation, the computer system can: aggregate approved instructional blocks from each digital procedure performed at the facility; compile these instructional blocks from these digital procedures into an instructional block library; and store the instructional block library, such as at the remote computer system, for retrieval by devices within the facility. In particular, the computer system can: access an electronic document for a procedure in a facility; identify a sequence of steps specified in the electronic document; extract an instruction for each step in the sequence of steps; initialize an instructional block, in a set of instructional blocks for this step; and populate the instructional block with the instruction. The computer system can then: repeat this process for multiple electronic documents corresponding to multiple procedures at the facility; and store these sets of instructional blocks in the instructional block library contained at a remote computer system.

In this implementation, the computer system can: access a record of instances of digital procedures completed (or "previously performed) by operators at the facility; and identify a subset of instances of verified digital procedure in the record of instances of digital procedures. In this example, each instance of a verified digital procedure in the subset of instances of verified digital procedures is: performed by an operator at the facility; and validated as a verified digital procedure by a supervisor overseeing digital procedures performed at the facility. In one example, the computer system can: present the record of instances of digital procedures to a supervisor (e.g., at a supervisor device) assigned to oversee digital procedures performed at the facility; and receive selection of instances of digital procedures, in the record of instances of digital procedures, from the supervisor to identify an instance of a digital procedure as a verified digital procedure. The computer system can then: initialize the instructional block library; and store instructional blocks in the verified digital procedure as a verified instructional block in the instructional block. In particular, for each instance of a verified digital procedure in the subset of instances of verified digital procedures, the computer system can: detect a sequence of instructional blocks representing a sequence of steps for the verified digital procedure; and, for each instructional block in the sequence of instructional blocks, store the instructional block as a verified instructional block in the instructional block library.

In another implementation, the computer system can: retrieve a particular instructional block from the instructional block library; modify text, media, values, etc. in this particular instructional block; generate a new instructional block based on this modified instructional block; and store this new instructional block in the instructional block library.

In one example of this implementation, the mobile device can: retrieve the instructional block library from a remote computer system; present the instructional block library to the operator at the mobile device; and confirm selection of a particular instructional block—by the operator—in the instructional block library presented to the operator. The computer system can then: load a modifiable instance of this particular instructional block at the mobile device of the operator; modify instructions, such as in the form of text, audio media, and visual media populated in the particular instructional block; record these modifications in a block procedure log for the particular instructional block; and generate a new instructional block based on this modified instructional block. Therefore, the computer system can generate new instructional blocks based on previously approved instructional blocks for digital procedures performed within the facility and thereby expedite review and approval process of this new instructional blocks.

In yet another implementation, the computer system can: at the mobile device of the operator, initialize a new instructional block; and generate a prompt for an operator to populate the new instructional block with an instruction. The computer system can then: serve this prompt at the mobile device of the operator; receive the instruction at the mobile device from the operator; and store this new populated instructional block at the instructional block library. For example, the computer system can: receive visual media for an instruction recorded by the operator via an optical sensor at the mobile device; receive a string of text from the operator representing the instruction via a computing interface at the mobile device; and/or receive audio media of the instruction recorded by the operator via a microphone at the mobile device. Additionally, the computer system can then populate the new instructional block with the text strings, audio media, and/or visual media received from the operator. Furthermore, the computer system can: confirm population of the new instructional block with the instruction from the operator; transmit this new instructional block to a supervisor device associated with a supervisor; and queue the new instructional block for approval and review by the supervisor.

A particular instructional block in the instructional block library can include data associated with the particular instructional block for the computer system to link the blocks to a step and/or series of steps contained within a modifiable digital procedure. For example, the particular instructional block can include labels or tags associated with this particular instructional block so an association can be made between the instructions that the particular instructional block provides, procedures currently linked to the particular instructional block, and what types of procedures and steps can be associated with the particular instructional block. Labeling of the instructional blocks allows for instructional blocks to be associated with related procedures, common procedures, equipment linked procedures, method linked procedures, or other procedure types. Instructional blocks can be uploaded from an external organization and receive labeling and/or tags when they are uploaded into the platform for association of client linked procedures for a contract manufacturing organization, where those instructional blocks are only linked to a specific client's procedures or an equipment vendor's instructional blocks where they are only linked to procedures involving that specific model of the vendor's equipment.

Additionally or alternatively, an instructional block in the block library can undergo scoring where each block receives a score for the quality of the instruction and the applicability to the procedures that they are currently linked to. In one example, an instructional block is scored by the clarity of the content, such as the clarity of the text, the audio quality of an audio clip (e.g., no static or distracting background noises), the video quality of the pixels, screen sizing, angle, and the clarity of the instructional material being shown. The quality scoring can include the conciseness of the material in the instructional block where the same level of instructional material is conveyed in a faster way compared to taking a significantly longer period of time to convey the same information. The quality of the scoring can contain the accuracy of the material where the instructional block can contain inaccurate information or outdated methods which would make it ineligible for linking to existing or new procedures. The scoring for the applicability to the procedures can include the relevance of the label and/or tags to the contents of the instructional block, the number of procedures and the types of procedures the instructional block is already linked to, and the operator voting over where they can upvote or downvote an instructional block for the quality of the content in the instructional block and the strength of the applicability to the procedures it is currently linked to. This scoring of the instructional blocks can be manually added by users and/or procedurally generated through an automated analysis algorithm.

11.2 Connected Manufacturing Network

In one implementation, the computer system can: retrieve digital procedures performed across a network of facilities; identify verified instructional blocks in the digital procedures performed across the network of facilities; and aggregate the verified instructional blocks into an instructional block library representing verified steps of procedures performed across the network of facilities. Accordingly, the computer system can: access an unverified draft instructional block for a new digital procedure authored by an operator; as described below, identify a verified instructional block in the instructional block library analogous to the unverified draft instructional block and corresponding to a particular facility in the network of facilities; replace the unverified draft instructional block in the new digital procedure with the verified instructional block from the instructional block library; and assign the new digital procedure to the particular facility corresponding to the verified instructional block.

Therefore, the computer system can: retrieve verified instructional blocks corresponding to one or more facilities (e.g., manufacturing facilities, testing facilities); compile the verified instructional blocks into an instructional block library; and implement the instructional block library to identify verified instructional blocks analogous to unverified draft instructional blocks of a new digital procedure.

12. New Digital Procedure

Blocks of the method S100 recite accessing a first unverified draft instructional block, authored by an operator, for a new digital procedure at the facility in Block S120. Generally, the computer system can: ingest a new digital procedure authored by an operator for the facility and corresponding to an unverified digital procedure at the facility; and identify unverified draft instructional blocks in the new digital procedure in order to imitate a verification cycle to identify verified instructional blocks analogous to the unverified draft instructional blocks. In particular, the computer system can: receive a modification to text content, audio content, and visual content in the unverified draft instructional block from the operator; characterize a scope of the modification in the unverified draft instructional block; and, in response to the scope of the modification exceeding a threshold scope of modification, initiate the verification cycle.

In one implementation, the computer system can: retrieve a verified instructional block from a verified digital procedure currently performed at the facility; and initialize an unverified draft instructional block based on representing a modifiable instance of the verified instructional block. Accordingly, the unverified draft instructional block can include text content, audio content, and visual content (e.g., video clips) extracted from the verified instructional block. The computer system can then: present the unverified draft instructional block to the operator (e.g., at an operator device); and receive modifications to the text content, audio content, and visual content from the operator. The computer system can then initiate a verification cycle, as described below, to identify verified instructional blocks in the instructional block library that are analogous to the unverified draft instructional block.

For example, the computer system can: access a verified digital procedure—corresponding to a digital procedure previously performed by operators at the facility—containing a verified instructional block including a first instruction in a text format; and initialize the unverified draft instructional block representing a modifiable instance of the verified instructional block including the first instruction in the text format. The computer system can then: render the unverified draft instructional block, including the first instruction in the text format, at a display of the operator device; receive modification (e.g., edit body of text) of the first instruction in the text format from the operator at the operator device; compile the unverified draft instructional block including the first instruction in the modified text format into the new digital procedure; and transmit the new digital procedure to a remote computer system. Accordingly, the computer system can then initiate a verification cycle, as described below, to identify a verified instructional block analogous to the unverified draft instructional block.

In another implementation, the computer system can: ingest an electronic document, such as drafted by the operator at the computer system, representing a new process performed at the facility; extract a sequence of steps from the electronic document; and transform the sequence of steps into the new digital procedure. The system can then initiate the verification cycle, as described below, to identify verified instructional blocks analogous to unverified draft instructional blocks in the new digital procedure.

For example, the system can: at a computer system, access an electronic document for a new procedure in the facility authored by the operator; and scan the electronic document to identify a sequence of steps specified in the electronic document. The system can then: extract an instruction in a text format for a first step in the sequence of steps; initialize a first unverified draft instructional block, in a set of unverified draft instructional blocks, for the first step; and populate the first unverified draft instructional block with the first instruction in the text format for the first step. Accordingly, the system can then repeat these steps for each step in the sequence of steps to populate the set of unverified draft instructional blocks.

The system can then: compile the set of unverified draft instructional blocks into the new digital procedure; and store the new digital procedure, such as within internal memory of the computer system. The system can then: access the new digital procedure containing the set unverified draft instructional blocks; and scan a first unverified draft instructional block, in the set of unverified draft instructional blocks, to identify a set of language signals during a verification cycle as described below.

Additionally, in the aforementioned example, the computer system can serve the new digital procedure to an operator device associated with the operator for completion of a first instance of the new digital procedure in the facility. Furthermore, the operator device can: record a media file, such as via an optical sensor coupled to the operator device, representing completion of the first instance of the new digital procedure in the facility; and transmit the media file to the computer system. The computer system can then: segment the media file into a set of media clips; and populate each unverified draft instructional block, in the set of unverified draft instructional blocks, with a corresponding media clip in the set of media clips.

Therefore, the computer system can: ingest a new digital procedure authored by an operator for performance at the facility; identify unverified draft instructional blocks in the new digital procedure; and initiate a verification cycle to identify verified instructional blocks analogous to the unverified draft instructional blocks in the new digital procedure.

12.1 Operator Profiles

In one implementation, the computer system can access an operator profile associated with the operator authoring the new digital procedure and specifying: a set of permissions for modifying digital procedures associated with the facility; and a minimum guidance specification for performing digital procedures associated with the facility. Accordingly, the computer system can then: access the instructional block library containing the set of verified instructional blocks based on the set of permissions in the operator profile; and access the set of language signals based on the minimum guidance specification in the operator profile.

For example, the computer system can: access an operator profile associated with the operator authoring the new digital procedure at the facility; extract a set of permissions from the operator profile specifying a list of equipment units authorized for handling by the operator; and restrict the operator from authoring and/or modifying digital procedures associated with equipment units absent from the list of equipment units. In another example, the computer system can: access an operator profile associated with the operator authoring the new digital procedure at the facility; extract a minimum guidance specification specifying a risk exposure threshold for the operator; and restrict the operator from authoring and/or modifying digital procedures associated with a risk exposure exceeding the risk exposure threshold.

Therefore, the computer system can: restrict access to the instructional block library according to an operator profile associated with the operator authoring the digital procedure; and minimize risk exposure to inexperienced operators authoring digital procedures for the facility.

13. Language Signals

Blocks of the method S100 recite: detecting a first set of language signals in the first unverified draft instructional block in Block S130; correlating a first equipment unit language signal, in the first set of language signals, with a first equipment unit located within the facility in Block S132; correlating a first action language signal, in the first set of language signals, with a first action prompt related to the first equipment unit in Block S134; and correlating a first risk language signal, in the first set of language signals, with a first process risk associated with execution of the first action prompt with the first equipment unit in Block S136.

Generally, the computer system can: scan text content, audio content, and visual content (e.g., video clips) contained within an instructional block; and detect a set of language signals in the text content, audio content, and visual content of the instructional block. More specifically, the computer system can detect: an equipment unit language signal, in the set of language signals, associated with a particular equipment unit at the facility; an action language signal, in the set of language signals, associated with an action prompt for the particular equipment unit; and a risk language signal, in the set of language signals, specifying a process risk associated with execution of the action prompt at the particular equipment unit. Thus, the computer system can then initiate a verification cycle to identify verified instructional blocks in the instructional block library that include the set of language signals detected in the unverified draft instructional block.

13.1 Text Content Language Signals

Generally, the computer system can: implement language models—such as natural language processing models or natural language understanding models tuned to particular language concepts—to detect words or phrases that represent critical language concepts in the unverified draft instructional block associated with a particular equipment unit. Additionally or alternatively, the computer system can implement natural language processing techniques to detect syntax (grammar, punctuation, spelling, formatting, sequence) characteristics for words or phrases in the unverified draft instructional block for the particular equipment unit.

13.1.1 Equipment Unit Signals

In one implementation, the computer system can: scan the text content stored in the unverified draft instructional block; and implement an equipment unit language processing model to detect words or phrases—in the set of instructional blocks—related to a corpus of equipment units (e.g., centrifuges, bio-reactors) located within the facility. For example, the computer system can detect words or phrases in the set of instructional blocks, such as: "centrifuge model #ABCD"; "bio-reactor interface"; or "scale calibration".

Accordingly, the computer system can generate an equipment unit signal that represent the equipment unit types of such equipment unit-related words or phrases in the unverified draft instructional block. For example, for each word or phrase detected in the unverified draft instructional block, the computer system can: normalize the word or phrase; and generate a first equipment unit action signal containing the normalized language value. In this example, the computer system can normalize: "locate centrifuge model #AABB", "bio-reactor parameters", and "scale calibration"; and store the normalized values in discrete action signals for the unverified draft instructional block.

In another example, the computer system generates a single equipment unit signal representing presence and/or absence of equipment unit types specified in the unverified draft instructional block. The computer system can also derive and store a frequency of equipment unit signals detected in the set of instructional blocks or represent a ratio of equipment unit signals to other words or phrases in the unverified draft instructional block.

13.1.2 Action Signals

In one implementation, the computer system can: scan text content stored in the unverified draft instructional block; and implement an action signal model to detect words or phrases—in the set of instructional blocks—related to actions and/or instructions associated with performance of digital procedures with the particular equipment unit within the facility. For example, the computer system can detect words or phrases in the set of instructional blocks, such as: "mix a first material and a second material"; or "calibrate the centrifuge to a target parameter".

Accordingly, the computer system can generate an action signal that represents the types and/or frequency of such action-related words or phrases in the unverified draft instructional block associated with the particular equipment unit. For example, for each word or phrase detected in the unverified draft instructional block, the computer system can: normalize the word or phrase; and generate a first action signal containing the normalized language value. In this example, the computer system can: normalize "turn on the centrifuge", "initiate the centrifuge", "start the equipment unit" to "trigger centrifuge"; and store the normalized values in discrete action signals for the unverified draft instructional block.

In another example, the computer system generates a single action signal representing presence and/or absence of action requests detected in the unverified draft instructional block. The computer system can also derive and store a frequency of action requests detected in the set of instructional blocks or represent a ratio of action requests to other words or phrases in the unverified draft instructional block.

13.1.3 Risk Signals

Similarly, the computer system can: scan text content in the unverified draft instructional block; and implement a risk signal model to detect words and/or phrases in the unverified draft instructional block related to threats, instability, and uncertainty associated with performance of digital procedures within the particular facility. For example, the computer system can detect words or phrases in the set of instructional blocks, such as: "combustible materials"; "warning: do not inhale"; and/or "contents can be hot".

Accordingly, the computer system can generate a risk signal that represents the types and/or frequency of such risk-related words or phrases in the unverified draft instructional block associated with the particular equipment unit. For example, for each word or phrase detected in the unverified draft instructional block, the computer system can: normalize the word or phrase; and generate a first risk signal containing the normalized language value. In this example, the computer system can: normalize "flammable materials", "incendiary hazard", "combustible elements" to "fire risk"; and store the normalized values in discrete action signals for the unverified draft instructional block.

In another example, the computer system generates one risk signal representing presence and/or absence of risk-related words or phrases detected in the unverified draft instructional block. The computer system can also derive and store a frequency of risk-related words or phrases detected in the set of instructional blocks or represent a ratio of risk-related words or phrases to other words or phrases in the unverified draft instructional block.

13.2 Audio Content Language Signals

In another implementation, the computer system can: scan audio content in the unverified draft instructional block, such as an audio recording dictating steps for performing the unverified draft instructional block; extract a set of audio features from the audio content; implement voice and/or audio recognition models—such as described in application Ser. No. 17/968,684, filed on 18 Oct. 2022, which is hereby incorporated in its entirety by this reference—to detect the set of language signals in the audio content based on the set of audio features; and correlate the set of language signals detected in the audio content to equipment units, action prompts, and/or process risks related to performing digital procedures at the facility.

In one example, the computer system can: access an audio file (e.g., audio file from a video clip) contained in the unverified draft instructional block dictating a process for the new digital procedure; access an audio recognition model trained on interpreting threats, instability, and uncertainty; extract a set of audio features from the audio file; and, based on the set of audio features and the audio recognition model, interpret dictation of words and/or phrases (e.g., fire alarms, glass breaking, panic phrases spoken by operator) related to threats, instability, and uncertainty associated with performance of digital procedures within the particular facility. Accordingly, the computer system can then: normalize the word and/or phrase related to the threat; and generate a risk language signal containing the normalized word and/or phrase.

Similarly, the computer system can implement an audio recognition model to interpret words and/or phrases in the audio file related to: a corpus of equipment units located within the facility; and/or actions associated with performance of digital procedures within the facility. Thus, the system can: detect equipment unit language signals and action language signals in the audio file; and, as described above, correlate these language signals to equipment units and action prompts related to steps of a digital procedure performed at the facility.

Therefore, the computer system can: access audio content contained in the unverified draft instructional block; detect a set of language signals in the audio content; and identify the verified instructional block in the instructional block library as analogous to the unverified draft instructional block in response to the verified instructional block including the set of language signals detected in the audio content.

13.3 Visual Content Language Signals

In another implementation, the computer system can: scan visual content (e.g., video clips, images, live video feeds) in the unverified draft instructional block, such as a video recording depicting an operator performing steps of the unverified draft instructional block; extract a set of visual features from the visual content; implement computer vision techniques and artificial intelligence models—such as described in application Ser. No. 17/968,684, filed on 18 Oct. 2022, which is hereby incorporated in its entirety by this reference—to detect the set of language signals in the visual content based on the set of features; and correlate the set of language signals detected in the visual content to equipment units, action prompts, and/or process risks related to performing digital procedures at the facility.

In one example, the computer system can: access a video clip contained in the unverified draft instructional block depicting an operator performing a step for the unverified draft instructional block; extract a set of visual features from the video clip; and implement computer vision techniques to interpret objects and/or actions performed by the operator in the video clip. More specifically, the computer system can: detect presence of a particular equipment unit depicted in the video clip based on the set of visual features; and generate the equipment unit language signal containing the particular equipment unit detected in the video clip.

Similarly, the computer system can implement computer vision techniques to interpret objects and/or actions depicted in the video clip related to: action prompts associated with performance of digital procedures within the facility; and process risks for executing the action prompts at the facility. Thus the system can: detect action language signals and risk language signals in the video clip; and, as described above, correlate these language signals to action prompts and process risks related to steps of a digital procedure performed at the facility.

Therefore, the computer system can access visual content contained in the unverified draft instructional block; detect the set of language signals in the visual content; and identify the verified instructional block, in the instructional block library, as analogous to the unverified draft instructional block in response to the verified instructional block including the set of language signals detected in the visual content.

14. Querying Instructional Block Library

Blocks of the method S100 recite identifying a first verified instructional block, in the set of verified instructional blocks contained in the instructional block library, as analogous to the first unverified draft instructional block in Block S140 in response to the first verified instructional block including language signals associated with the first equipment unit, the first action prompt, and the first process risk.

Generally, the computer system can: query the instructional block library for verified instructional blocks including the set of language signals detected in the unverified draft instructional block; locating a verified instructional block in the instructional block library containing the set of language signals; and identify the verified instructional block as analogous to the unverified draft instructional block. More specifically, the computer system can detect an equipment unit language signal, an action language signal, and a risk language signal in the verified instructional block that matches the set of language signals detected in the unverified draft instructional block. Thus, the computer system can automatically verify the new digital procedure for dissemination across operators performing digital procedures in the facility in response to identifying the new digital procedure as exclusively containing verified instructional blocks.

14.1 Language Signal Tags

In one implementation, the computer system can: generate a language signal tag specifying the set of language signals detected in the unverified draft instructional block; and link the language signal tag to the unverified draft instructional block. The computer system can then: query a set of language signal tags corresponding to the set of verified instructional blocks contained in the instructional block library; and identify a verified instructional block, in the instructional block library, as analogous to the unverified draft instructional block based on the language signal tag of the unverified draft instructional block matching language signals for the verified instructional block.

For example, for an unverified draft instructional block in the new digital procedure, the computer system can: initialize a first language signal tag; populate the first language signal tag with the equipment unit signal, the action signal, and the risk signal; and link the first language signal tag to the unverified draft instructional block. Additionally, for a verified instructional block in the instructional block library, the computer system can: scan the verified instructional block for the set of language signals including the equipment unit signal, the action signal, and the risk signal; initialize a language signal tag, in a set of language signal tags, for the verified instructional block; populate the language signal tag with the equipment unit signal, the action signal, and the risk signal, in the verified instructional block; and link the language signal tag to the verified instructional block. The system can then repeat these steps across each verified instructional block, in the instructional block library, to aggregate a set of language signal tags representing language signals detected across verified instructional blocks in the instructional block library. Accordingly, the computer system can then: identify a particular language signal tag, in the set of language signal tags for the set of instructional blocks, as matching the language signal tag for the unverified draft instructional block; and extract the verified instructional block, from the set of verified instructional blocks contained in the library, including the particular language signal tag.

In another example, the computer system can detect the set of language signals in text content, audio content, and visual content contained within the instructional block. In this example, the set of language signals include: an equipment unit language signal corresponding to a particular equipment unit in the facility; an action language signal corresponding to an action prompt for the particular equipment unit; and a risk language signal corresponding to a process risk associated with execution of the action prompt for the particular equipment unit. The computer system can then store the set of language signals in a language signal tag, in a set of language signal tags, associated with the instructional block. The computer system can then: query the set of language signal tags for a first language signal tag including the first equipment unit language signal, the first action language signal, and the first risk language signal; and, in response to identifying the first language signal tag, retrieve the first verified instructional block associated with the first language signal tag, from the instructional block library.

Therefore, the computer system can: scan an unverified draft instructional block of a new digital procedure for a set of language signals; and identify a verified instructional block, in the instructional block library, as analogous to the unverified draft instructional block in the new procedure. Accordingly, the computer system can modify the new digital procedure by replacing the unverified draft instructional block with the verified instructional block to expedite approval process for the new digital procedure at the facility.

14.2 Related Instructional Block

In one implementation, the computer system can: scan an unverified draft instructional block of the new digital procedure for a set of language signals; and, based on the set of language signals, identify a verified instructional block, in the instructional block library, as related to (e.g., non-analogous) the unverified draft instructional block. In particular, the computer system can: select a subset of language signals in the set of language signals (e.g., equipment unit signals, action signals); query the instructional block library for verified instructional blocks including the subset of language signals; and, in response to a verified instructional block including the subset of language signals, identify the verified instructional block as related to the unverified draft instructional block.

In one example, the computer system can: access an unverified draft instructional block, authored by an operator, for the new digital procedure at the facility; and detect a set of language signals in the unverified draft instructional block. The computer system can then: correlate an equipment unit language signal, in the set of language signals, with an equipment unit located within the facility; correlate an action language signal, in the set of language signals, with an action prompt related to the equipment unit; and correlate a risk language signal, in the set of language signals, with a process risk associated with execution of the action prompt with the equipment unit. The computer system can then identify a verified instructional block, in the set of verified instructional blocks contained in the instructional block library, as related to the unverified draft instructional block in response to: the verified instructional block including language signals associated with the equipment unit and the action prompt; and detecting absence of the risk language signal in the verified instructional block. The computer system can thus: insert the verified instructional block, in place of the unverified draft instructional block, in the new digital procedure; and flag the new digital procedure for manual review by a supervisor overseeing digital procedures performed at the facility.

Therefore, the computer system can: identify a first verified instructional block, contained in the instructional block library, as analogous to a first unverified draft instructional block in the new procedure; identify a second verified instructional block, in the instructional block library, as related to a second unverified draft instructional block in the new procedure; and modify the new digital procedure to replace the first unverified draft instructional block with the first verified instructional block and the second unverified draft instructional block with the second verified instructional block.

14.3 No Related Instructional Blocks

In one implementation, the computer system can: scan an unverified draft instructional block of the new digital procedure for a set of language signals; and, based on the set of language signals, identify absence of a verified instructional block, in the instructional block library, as related or analogous to the unverified draft instructional block. In particular the system can: query the instructional block library for verified instructional blocks including the set of language signals; and, in response to detecting absence of a verified instructional block—including the set of language signal in the instructional block library—identify absence of a verified instructional block to replace the unverified draft instructional block.

In one example, the computer system can: access an unverified draft instructional block, authored by an operator, for the new digital procedure at the facility; and detect a set of language signals in the unverified draft instructional block. The computer system can then: correlate an equipment unit language signal, in the set of language signals, with an equipment unit located within the facility; correlate an action language signal, in the set of language signals, with an action prompt related to the equipment unit; and correlate a risk language signal, in the set of language signals, with a process risk associated with execution of the action prompt with the equipment unit. The computer system can then, identify absence of language signals associated with the equipment unit, the action prompt, and the process risk, in the set of verified instructional blocks contained in the instructional block library. Thus, in response to identifying the absence of language signals, the computer system can flag the new digital procedure for manual review by a supervisor overseeing digital procedures performed at the facility.

Therefore, the computer system can: scan an unverified draft instructional block in the new digital procedure for a set of language signals; based on the set of language signals, identify absence of a verified instructional block, in the instructional block library, as analogous to the unverified draft instructional block; and transmit the new digital procedure, such as to a supervisor device associated with a supervisor within the facility, for manual review.

15. Insertion From Instructional Block Library

Blocks of the method S100 recite inserting the first verified instructional block, in place of the first unverified draft instructional block, in the new digital procedure in Block S150.

Generally, the computer system can: retrieve the verified instructional block—analogous to the unverified draft instructional block in the new digital procedure—from the instructional block library; and insert the verified instructional block into the new digital procedure by replacing the unverified draft instructional block with the verified instructional block from the instructional block library. More specifically, the computer system can: initiate verification cycles to replace unverified draft instructional blocks in the new digital procedure with verified instructional blocks from the instructional block library; and, in response to detecting the new digital procedure as exclusively containing verified instructional blocks, publish the new digital procedure at the facility.

15.1 New Digital Procedure Publication

In one implementation, the computer system can initiate a verification cycle to replace unverified draft instructional blocks in the new digital procedure with verified instructional blocks contained in the instructional block library. Thus, in response to the new digital procedure exclusively containing verified instructional blocks, the computer system can: flag the new digital procedure as a verified digital procedure approved for integration at the facility; and disseminate the new digital procedure across operators at the facility assigned to perform the new digital procedure. In particular, the computer system can: autonomously identify verified instructional blocks, in the instructional block library, as unverified draft instructional blocks in the new digital procedure; and autonomously approve the new procedure for publication in the facility in response to the new digital procedure exclusively containing verified instructional blocks.

In one example, the computer system can transmit the new digital procedure containing the verified instructional block to a second operator device associated with a second operator assigned to perform the new digital procedure at the facility. Thus, in response to initiation of the verified instructional block by the second operator, the computer system can: extract an instruction, in a set of formats (e.g., text format, audio format, visual format), from the verified instructional block; and present the instruction in a particular format, in the set of formats, corresponding to a particular degree of guidance corresponding to the first process risk specified in an operator profile associated with the second operator.

Therefore, the computer system can initiate verification cycles for the new digital procedure in order to expedite publication of the new digital procedure at the facility and thus disseminate the new digital procedure to operators at the facility assigned to perform digital procedures at the facility.

15.2 Modifying Verified Instructional Blocks

In one implementation, the computer system can receive manual selection of a verified instructional block in the instructional block library by the operator authoring the digital procedure. The computer system can then: access an operator profile associated with the operator and specifying permissions for modifying verified instructional blocks at the facility; in response to detect modification permissions in the operator profile, receive a modification (e.g., edits to text content, audio content, visual content) to the verified instructional block in the new digital procedure by the operator; and generate the unverified draft instructional block based on the modified verified instructional block authored by the operator. The computer system can thus, as described above, initiate a verification cycle to identify a verified instructional block, in the instructional block library, as analogous to the unverified draft instructional block derived from the modified verified instructional block.

In one example, the computer system can: based on language signals detected in the unverified draft instructional block, extract a set of verified instructional blocks—analogous to the unverified draft instructional block—from the instructional block library; and transmit the set of verified instructional blocks to an operator device associated with the operator authoring the new digital procedure. The operator device can then: present the set of verified instructional blocks, such as in a text format and/or a video format, at an interactive display coupled to the operator device; receive selection of a verified instructional block, in the set of verified instructional blocks presented at the interactive display, corresponding to a verified instructional block currently performed within the facility; and transmit the selected instructional block to the computer system.

Additionally, in response to modifying the verified instructional blocks in the new digital procedure, the computer system can append an audit trail for authoring the new digital procedure with: an identifier of the operator authoring the new digital procedure; an identifier of a current revision of the first unverified draft instructional block in the new digital procedure; and the first verified instructional block analogous to the first unverified draft instructional block.

Furthermore, the computer system can characterize a scope of modification to the verified instructional block selected by the operator, such as based on: a recorded time window during modification of the verified instructional block exceeding a threshold time window, receiving modification of a restricted parameter in the verified instructional block, and/or modification parameters specified in an operator profile associated with the operator authoring the new digital procedure. Thus, in response to the scope of modification exceeding a threshold scope of modification, the computer system can: generate the unverified draft instructional block representing the modified verified instructional block; and initiate the verification cycle to scan the unverified draft instructional block for the set of language signals. Accordingly, the computer system can then identify a verified instructional block, in the set of verified instructional blocks contained in the instructional block library, as analogous to the unverified draft instructional block in response to the first verified instructional block including language signals associated with the set of language signals.

Therefore, the computer system can: initiate a modifiable instance of the verified instructional block contained in the instructional block library; receive a modification (e.g., modification to text content, audio content, visual content) to the modifiable instance of the verified instructional block; and, in response to a scope of the modification exceeding a threshold scope, generate an unverified draft instructional block based on the modified verified instructional block. Accordingly, as described above, the computer system can: initiate a verification to identify a verified instructional block, in the instructional block library, as analogous to the unverified draft instructional block; and replace the unverified draft instructional block with the verified instructional block in the new digital procedure.

15.3 Risk Tolerance: Insertion from Step Library

In one implementation, the computer system can: access a risk tolerance corresponding to a degree of risk for integrating the new digital procedure at a facility; identify a verified instructional block, in the instructional block library, analogous to the unverified draft instructional block in the new digital procedure; calculate a risk score for replacing the unverified draft instructional block in the new digital procedure with the verified instructional block; and in response to the risk score of the verified instructional block exceeding the risk tolerance, inserting the verified instructional block in place of the unverified draft instructional block in the new digital procedure.

In one example, the computer system can: access a verified instructional block from the instructional block library corresponding to a verified step performed at a facility; access a set of historical records corresponding to instances of the verified instructional block performed at the facility; and calculate the risk score for the verified instructional block based on the set of historical records for the verified instructional block. More specifically, the computer system can calculate the risk score based on: a quantity of instances of the verified instructional block performed at the facility that achieved a target outcome (e.g., batch quantity, batch quality); and/or a set of operator profiles corresponding to operators within the facility assigned to perform the verified instructional block.

Alternatively, in response to the risk score of the verified instructional block falling below the risk tolerance, the computer system can: insert the verified instructional block in place of the unverified draft instructional block in the new digital procedure; and flag the new digital procedure for manual review, such as by a supervisor overseeing digital procedures performed at the facility.

Therefore, the computer system can: receive modification of the risk tolerance for integrating the new digital procedure from an operator authoring the new digital procedure; retrieve a set of verified instructional blocks in the instructional block library corresponding to the risk tolerance assigned by the operator; and identify verified instructional blocks analogous to the unverified draft instructional blocks in the new digital procedure from the set of verified instructional blocks. Thus, the computer system can: automatically publish new digital procedures exclusively containing verified instructional blocks above a target risk tolerance; and, assign the new digital procedure for performance within the facility.

16. Variation: Instruction Video Feed

Figure 5:
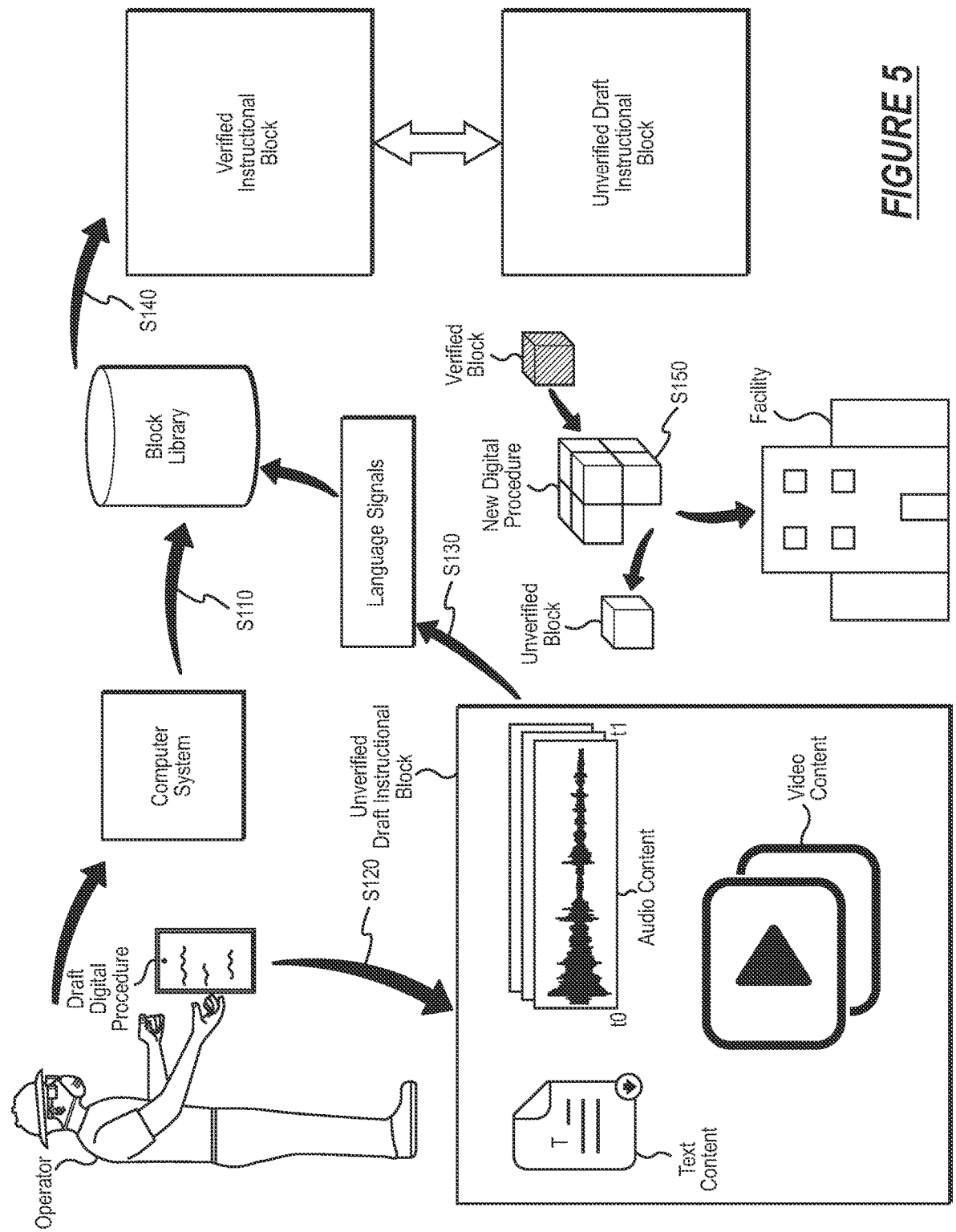
FIG. 5 is a flowchart representation of one variation of the method.
Figure 6:
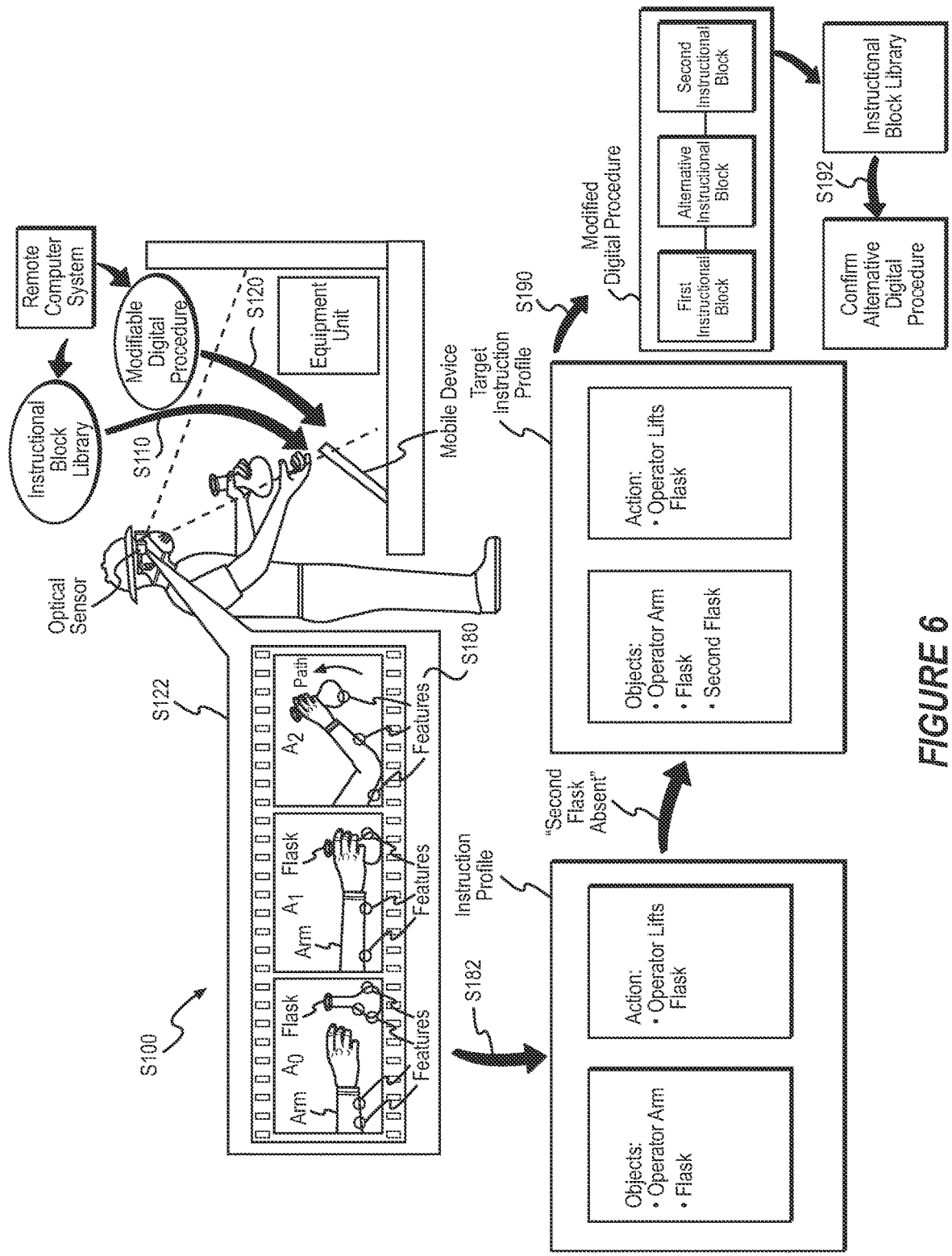
FIG. 6 is a flowchart representation of one variation of the method.

As shown in FIG. 5, a method S100 for modifying steps of a procedure includes: accessing an instructional block library containing a set of instructional blocks associated with approved digital procedures performed within a facility in Block S110; and accessing a new digital procedure, containing a first unverified draft instructional block, corresponding to a new digital procedure at the facility authored by an operator in Block S120; and, in response to initiation of the first instructional block in the digital procedure, accessing an instruction video feed, of the operator, captured during performance of the first instruction in Block S122.

Additionally, the method S100 includes: extracting a first set of instruction features from the instruction video feed in Block S180; and generating an instruction profile representing performance of the first instruction based on the first set of instruction features in Block S182.

Furthermore, the method S100 includes, in response to identifying a deviation, exceeding a threshold deviation, between the instruction profile of the first instruction and a target instruction profile of the first instruction in the first instructional block: initializing an alternative instructional block for the digital procedure including an alternative instruction associated with the instruction profile in Block S190; querying an instructional block library for the alternative instructional block; and, in response to locating the alternative instructional block in the instructional block library, modifying a current instance of the digital procedure to contain the alternative instructional block including the alternative instruction in Block S192.

16.1 Applications: Real Time Insertion from Step Library

Generally, a computer system (e.g., a computer network) and/or a mobile device (e.g., a smartphone, tablet, augmented reality headset) can execute Blocks of the method S100 to: modify existing digital procedures representing processes currently performed at a facility containing non-networked equipment; and/or generate new digital procedures representing new processes and/or variations of previous processes derived from these existing procedures at the facility. In particular, the mobile device can access a modifiable digital procedure that contains a sequence of modifiable instructional blocks, wherein some or all of these blocks contain instructions for completing a specified task in multiple modifiable formats, such as: a text format; an audio format (e.g., an audio clip); a video format (e.g., a video clip); and/or a virtual format (e.g., an augmented, virtual, or mixed reality display). The mobile device can: present the modifiable digital procedure to an operator, such as via an interactive display; prompt the user to modify one or more formats for the first instruction within the first instructional block; and record modifications to the digital procedure at a procedure log for a current instance of the digital procedure.

Additionally or alternatively, the system can: retrieve an instructional block library representing a list of approved instructional blocks derived from digital procedures performed at the facility; and present this instructional block library—such as at the interactive display of the mobile device—to the operator; and prompt the operator to exchange the modifiable instructional blocks in the modifiable digital procedure with approved instructional blocks in the instructional block library; in order to generate a new digital procedure exclusively containing approved instructional blocks performed at the facility.

In one example, the mobile device can: access an instruction video feed, such as from a live video feed from an optical sensor coupled to the mobile device, during performance of the digital procedure in the facility; and extract features from this instruction video feed in order to generate an instruction profile representing performance of the digital procedure based on these features. The instruction profile can represent features, such as objects, paths, velocities, operator actions depicted in the instruction video feed during performance of the digital procedure. The system can then: identify deviations of this instruction profile from a target instruction profile contained in the instructional block representing ideal performance of the first instruction of the digital procedure; and automatically modify the current instruction of the digital procedure in response to identifying the deviation of the instruction profile from the target instruction profile.

In particular the system can: initialize an alternative instructional block in the digital procedure including the instruction profile representing performance of the first instructional block in the digital procedure; and identify this alternative instructional block in the instructional block library, such as by querying the instructional block library to locate the alternative instructional block in the instructional block library containing the corresponding instruction profile. In response to locating the alternative instructional block in the instructional block library, the system can then: exchange the first instructional block with the alternative instructional block; and generate a new digital procedure including this alternative instructional block.

Therefore, the system can: generate a new digital procedure containing approved instructional blocks from digital procedures performed within the facility; track modifications to instructional blocks of the previous digital procedure; transmit the new digital procedure and the recorded modifications of the previous digital procedure to a supervisor device associated with a supervisor, thereby expediting approval and review process for this new digital procedure for execution at the facility.

16.2 Instruction Video Feed

One variation of the method S100 recites, in response to initiation of the first instructional block in the digital procedure, accessing an instruction video feed of the operator, captured during performance of the first instruction. Generally, in this variation of the method S100, the system accesses video feeds recorded by an optical sensor during performance of the digital procedure.

In one implementation, the system can retrieve instruction video feeds directly from an optical sensor, such as located at the mobile device of the operator, in real-time during performance of the digital procedure in response to initiating the first instructional block in the digital procedure. Additionally or alternatively the system can retrieve instruction video feeds recorded by the optical sensor, uploaded from the optical sensor to a file system via a computer network, and stored in an instruction video database. In this implementation, the system can retrieve the instruction video in a particular video format, such as a continuous video stream depicting the operator performing instructional blocks of the digital procedure; and/or individualized video clips, each depicting performance of a particular instructional block in the digital procedure. Additionally, the instruction video feed can be captured from the optical sensor, such as during performance of the digital procedure at the facility, during testing of instructional blocks at a test facility, and/or during a calibration routine. In one variation of this implementation, multiple optical sensors can be utilized where the system records multiple angles and views of the same event and the platform can build an instructional block consisting of one or multiple sensor devices. The optimal video resolutions, distance, angles, and relevance to the procedure steps can be selected as the primary content of the instructional block that the operator is able to view when linked to a step, where the other content is either available within the instructional block, linked to the instructional block, or deleted.

In this implementation, the mobile device can include: a visible light camera (e.g., a RGB CMOS, or black and white CCD camera) that captures instruction video feeds (e.g., digital color video feeds) of an operator located at an operator cell within the facility performing instructional blocks of the digital procedure; and a data bus that offloads instruction video feeds, such as to a local or remote database. The mobile device associated with the operator can additionally or alternatively include multiple visible light cameras, one or more infrared cameras, thermal imaging cameras, etc.

In one example, upon receipt or retrieval of an instruction video feed, the system can: implement computer vision techniques (e.g., object recognition, edge detection, etc.) to identify objects—such as hands of operators and equipment units—depicted in the instruction video feed to identify a perimeter or boundary of the these objects; and crop the instruction video feed around these objects such that only features corresponding to these objects are extracted from the instruction video feed. The system can thus, aggregate instruction video feeds for instructional blocks of a digital procedure performed within the facility, wherein each instruction video feed captures visual characteristics of a unique performance of an instructional block in a digital procedure.

Therefore, the system can: access an instruction video feed depicting performance of a modifiable digital procedure in preparation to extract features from the instruction video feed depicting the operator performing instructions deviating from instructional blocks of a current instance of the digital procedure.

In another implementation, the system can access a combination of instruction video feeds and instruction images recorded during performance of the digital procedure. In one example, the system can extract instruction images from instruction video feeds by identifying video frames (i.e., static images extracted from the video feed) in the instruction video feeds corresponding to performance of particular instructional blocks in a digital procedure.

16.3 Instruction Profile

One variation of the method S100 further recite: extracting a first set of instruction features from the instruction video feed; and generating an instruction profile representing performance of the first instruction based on the first set of instruction features. Generally, the system can: identify multiple (e.g., "n" or "many") features representative of performance of the digital procedure in an instruction video feed; characterize these features over a duration of the instruction video feed, such as over a duration corresponding to performance of an instruction video feed in the digital procedure; and aggregate these features into a multi-dimensional feature profile uniquely representing performance of this digital procedure, such as duration of time periods, relative orientations, geometries, relative velocities, lengths, angles, etc. of these features.

In one implementation, the system can implement an instruction feature classifier that defines types of instruction features (e.g., corners, edges, areas, gradients, orientations, strength of a blob, etc.), relative positions and orientations of multiple instruction features, and/or prioritization for detecting and extracting these instruction features from the instruction video feed. In this implementation, the system can implement: low-level computer vision techniques (e.g., edge detection, ridge detection); curvature-based computer vision techniques (e.g., changing intensity, autocorrelation); and/or shape based computer vision techniques (e.g., thresholding, blob extraction, template matching) according the instruction feature classifier in order to detect instruction features representing performance of the digital procedure in the instruction video feed. The system can then generate a multi-dimensional (e.g., n-dimensional) instruction feature profile representing multiple features extracted for a duration in the instruction video feed.

In one example, the system can: in response to initialization of a first instructional block in a modifiable digital procedure retrieved by a mobile device associated with the operator, generate a prompt to the operator to record performance of the first instructional block; access an instruction video feed captured by an optical sensor such as coupled to an augmented reality headset, as described above, depicting performance of this first instructional block; and extract a set of features from the instruction video feed. The system can then: identify a set of objects in the instruction video feed based on the set of features, such as hands of an operator, equipment units handled by the operator during performance of the first instructional block, a string of values on a display of an equipment unit; and generate an instruction profile for the first instructional block including the set of objects identified in the instruction video feed.

Therefore, the system can: identify objects in instruction video feeds associated with performance of instructional blocks in the digital procedure; represent these objects in an instruction profile; and confirm presence of pertinent objects necessary for performing the digital procedure based on the instruction profile.

Furthermore, in this implementation, the system can interpret actions carried out by an operator during performance of instructional blocks of the digital procedure based on the set of features extracted from the instruction video feed. In one example of this implementation, the system can: identify a first object (e.g., a flask) in the instruction video feed associated with performance of the first instructional block in the digital procedure; identify a second object (e.g., hand of an operator handling the first object and/or equipment units) in the instruction video feed associated with performance of the first instructional block in the digital procedure; and track relative positions, paths, and velocities of these objects for a duration in the instruction video feed corresponding to performance of the first instructional block. The system can then implement template matching techniques for these relative positions, paths, velocities of these objects in order to identify actions performed by the operator in the instruction video feed (e.g., filling the flask with a liquid substance). The system can then generate the instruction profile including the first object, the second object, and motion (e.g., velocities, path, location) of these objects during performance of the digital procedure.

Therefore, the system can: interpret actions carried out by operators depicted in the instruction video feed; represent these actions in an instruction profile for instructional blocks of the digital procedure; and confirm presence of actions necessary for performing instructional blocks of the digital procedure based on the instruction profile.

16.3.1 Target Instruction Profile

In one implementation, the system can: generate a target instruction profile for instructional blocks of a digital procedure representing ideal performance of these instructional blocks; populate instructional blocks of the digital procedure with a target instruction profile for each instructional block in the digital procedure. In particular, the system can: retrieve a first instruction for each instructional block of a digital procedure in a video format corresponding to a high degree of guidance for performing the first instruction as described above; extract a set of target instruction features from the video format of the first instruction; generate a target instruction profile based on the set of target instruction features representing ideal performance of the first instruction, such as target time duration, target object presence, target object path, target values from equipment units, etc.; and populate each instructional block for the digital procedure with the target instruction profile. Therefore, the system can: generate target instruction profiles for instructional blocks of a digital procedure; and, during performance of an instance of the digital procedure, identify deviations from a current instruction profile to the target instruction profile; and automatically modify the instructional block in response to identifying these deviations.

16.4 Automatic Procedural Changes

One variation of the method S100 further recites, in response to identifying a deviation, exceeding a threshold deviation, between the instruction profile of the first instruction and a target instruction profile of the first instruction in the first instructional block: initializing an alternative instructional block for the digital procedure including an alternative instruction associated with the instruction profile; querying an instructional block library for the alternative instructional block; and, in response to locating the alternative instructional block in the instructional block library, modifying a current instance of the digital procedure to contain the alternative instructional block including the alternative instruction. Generally, the system can: identify deviations of an instruction profile generated during performance of an instructional block from a target instruction profile of the instructional block in a digital procedure; and automatically modify the digital procedure in response to identifying a deviation of the instruction profile exceeding a threshold deviation from the target instruction profile. In particular the system can automatically: modify a current instance of the digital procedure by interchanging and/or adding instructional blocks retrieved from the instructional block library with existing instructional blocks in a current instance of the digital procedure; and/or modify instructions populated in instructional blocks of the current instance of the digital procedure based on the instruction profile generated during performance of the digital procedure in order to generate a new digital procedure.

Alternatively, the system can identify a deviation, exceeding a threshold deviation, and provide a recommended instructional block from the block library based on the scoring of the quality of the instructional block and the applicability to the procedure being performed. The operator performing the digital procedure can review the instructional block and confirm the relevance to the procedure. The system can then transmit the instructional block to a supervisor for approval of the change to the platform, or flag the instructional block as not being relevant for being associated with the procedure step in the digital procedure.

Alternatively, the system can add augmentations to an existing step which provides a higher level of clarity to the instructional block to what is being performed. As an example, system can include an augmentation of a visual arrow to the video clip as part of a step where the operator needs to perform the task. The augmented visual arrow as part of the video clip can be accepted or rejected by an operator as part of the review process and/or scoring of the instructional block.

16.4.1 Insertion from Instructional Block Library

In one implementation, the system can: retrieve a modifiable digital procedure for a process performed in a facility; access an instruction video feed of an operator performing a first instructional block of the modifiable digital procedure; extract a set of features from this instruction video feed; and generate an instruction profile for the first instructional block performed in the instruction video feed. In this implementation, the system can then: execute artificial intelligence techniques to identify a deviation of the instruction profile from a target instruction profile of the first instruction; initialize an alternative instructional block in response to detecting the deviation; populate the alternative instructional block with the instruction profile generated during performance of the first instructional block of the modifiable digital procedure; and subsequently query the instructional block library to identify the alternative instructional block in the instructional block library based on the instruction profile. In response to locating the alternative instructional block in the instructional block library, the system can then: modify a current instance of the digital procedure, such as by exchanging the first instructional block with the alternative instructional block identified in the instructional block library.

In one example, the system can generate an instruction profile for the first instructional block including: a first object representing the hands of an operator; and a second object representing an equipment unit (e.g., a flask) handled by the operator during the first instructional block of the digital procedure. The system can then: identify absence of a third object (e.g., a burner) in the instruction profile based on the target instruction profile retrieved from the first instructional block; initialize the alternative instructional block; an populate the alternative instructional block with the instruction profile representing: presence of the first object and the second object; and absence of the third object during performance of the first instructional block of the digital procedure. Additionally, the system can then query the instructional block library to identify the alternative instructional block containing the instruction profile in the instructional block library. In response to identifying the alternative instructional block in the instructional block library, the system can then automatically modify the current instance of the digital procedure by exchanging the first instructional block with the alternative instructional block.

Therefore, the system can: repeat this process in order to modify subsequent instructional blocks in digital procedure; exchange instructional blocks in the digital procedure with approved instructional blocks identified in the instructional block library; and thereby, in real-time, automatically modify the digital procedure without the need of approval or review from a supervisor. Additionally or alternatively, in response to identifying absence of the alternative instructional block in the instructional block library, the system can: flag the current instance of the modified digital procedure; and generate a prompt notifying the operator that the alternative instructional block falls out of range of approved instructional blocks designated for the facility.

In an alternate example, the system can process multiple video feeds and/or recorded clips and combine them into a single instructional block used for the instruction in the performance of a step. In this example, the system can include multiple optical sensors, sensor types, angles, screen sizing, and video resolutions being combined through artificial intelligence and machine learning to provide a series of angles that best represents how the operator performs the tasks for the completion of the steps. In addition, the artificial intelligence and machine learning in the platform can provide augmentations within the instructional block, by adding augmented content (i.e., an augmented arrow pointing to the next step) to either the recorded video or the live video feed during the performance of the step. The operator can accept or reject the sequencing of the video clips and/or the augmentations that were procedurally provided by the system. The supervisor can then approve or reject the procedurally generated content before the instructional block is approved for usage within the linked digital procedure. The operator's performing the tasks utilizing the instructional blocks can upvote or downvote the quality of the content and/or provide comments of the instructional block to initiate a review of the content so the content can be improved, optimized, removed, or replaced.

In another alternate example, the system can generate a virtual model of the instructions for an instructional block. In this example, the system can include a virtual environment for training the operator on conducting the tasks described for the performance of the steps. This can include the conversion of the text to speech for the instructional block, which can be auto-translated into different languages. This can also include a virtual representation of the operator where the optical sensor can capture and/or motion capture an operator performing a task and the system builds a 3D wireframe model of the operator's movements and technique. The 3D wireframe model can be overlayed by an avatar of an operator, to conceal their identity, personal identifiers, and prevent the removal of the content if they leave the company and to no longer allow permissions to share their likeness for the instructional content already created. 3D models of the facility and/or equipment can be incorporated into the virtual environment where they can be merged from different sources, such as the facility model coming from an existing company CAD model where the 3D equipment models can be received from the equipment vendor that manufactures the equipment and provides the 3D models in a portable format to be used with mobile devices. The avatar can perform the step procedures as per the operator's movements through motion capture link it to the virtual environment and include it in the instructional block for usage by the platform to link to digital procedure steps.

16.4.2 New Digital Procedure Generation

In another implementation, the system can: identify a deviation of the instruction profile from a target instruction profile of the first instruction; automatically modify the first instruction populated in the first instructional block based on the deviation of the instruction profile; record the modifications to the first instructional block at a procedure log for a current instance of the digital procedure; and generate a new digital procedure based on the modified digital procedure. In particular, the system can modify the first instructional block such as by, exchanging the video format of the first instruction with the instruction video feed captured during performance of the first instruction and/or prompting the operator to modify a text format of the first instruction. The system can then: generate a new digital procedure based on this modified digital procedure; and transmit this new digital procedure to a supervisor for review and approval.

Additionally or alternatively, the system can: initialize an alternative instructional block based on a deviation of the instruction profile; and automatically populate the first instructional block based on objects, operator actions, time durations, equipment unit values represented in the instruction profile generated for the first instructional block. For example, the system can automatically: populate the video format for an alternative instruction in the alternative instructional block with the instruction video feed captured during performance of the current instance of the digital procedure; generate an alternative text instruction in the alternative instructional block based on objects, paths, operator actions, equipment unit values, represented in the instruction profile generated during performance of the current instance of the digital procedure; and exchange the first instructional block in the digital procedure with the alternative instructional block. Thus, the system can generate a new digital procedure including the alternative instructional block generated during performance of the current instance of the digital procedure.

Therefore, the system can: label approved instructional blocks in the new digital procedure based on identifying these instructional blocks in the instructional block library; flag alternative instructional blocks in the new digital procedure absent from the instructional block library; transmit this new digital procedure to a supervisor device associated with a supervisor; and expedite approval and review process for the supervisor.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for modifying steps of a procedure comprising:
    accessing an instructional block library containing a set of verified instructional blocks associated with approved digital procedures performed within a facility;
    accessing a first unverified draft instructional block, authored by an operator, for a new digital procedure at the facility;
    detecting a first set of language signals in the first unverified draft instructional block;
    correlating a first equipment unit language signal, in the first set of language signals, with a first equipment unit located within the facility;
    correlating a first action language signal, in the first set of language signals, with a first action prompt related to the first equipment unit;
    correlating a first risk language signal, in the first set of language signals, with a first process risk associated with execution of the first action prompt with the first equipment unit;
    identifying a first verified instructional block, in the set of verified instructional blocks contained in the instructional block library, as analogous to the first unverified draft instructional block in response to the first verified instructional block comprising language signals associated with the first equipment unit, the first action prompt, and the first process risk; and
    inserting the first verified instructional block, in place of the first unverified draft instructional block, in the new digital procedure.

2. The system of claim 1, further comprising:
    at a remote computer system, transmitting the new digital procedure containing the first verified instructional block to a second operator device associated with a second operator assigned to perform the new digital procedure at the facility; and
    in response to initiation of the first verified instructional block by the second operator:
        extracting a first instruction, in a set of formats, from the first verified instructional block;
        presenting the first instruction in a particular format, in the set of formats, corresponding to a particular degree of guidance corresponding to the first process risk.

3. The method of claim 1, wherein accessing the instructional block library containing the set of verified instructional blocks associated with approved digital procedures performed within the facility comprises:
    accessing a record of instances of digital procedures completed at the facility;
    identifying a subset of instances of verified digital procedure in the record of instances of digital procedures, each instance of a verified digital procedure in the subset of instances of verified digital procedures:
    performed by an operator at the facility; and
    validated as a verified digital procedure by a supervisor overseeing digital procedures performed at the facility;
    initializing the instructional block library; and
    for each instance of a verified digital procedure in the subset of instances of verified digital procedures:
        detecting a sequence of instructional blocks representing a sequence of steps for the verified digital procedure; and
        for each instructional block in the sequence of instructional blocks, storing the instructional block as a verified instructional block in the instructional block library.

4. The method of claim 3, further comprising, for each instructional block in the sequence of instructional blocks:
    detecting a set of language signals in text content, audio content, and visual content contained within the instructional block, the set of language signals comprising:
        an equipment unit language signal corresponding to a particular equipment unit in the facility;
        an action language signal corresponding to an action prompt for the particular equipment unit;
        a risk language signal corresponding to a process risk associated with execution of the action prompt for the particular equipment unit; and
        tagging the equipment unit language signal, the action language signal, and the risk language signal to the instructional block; and
    storing the instructional block tagged with the equipment unit language signal, the action language signal, and the risk language signal in the instructional block library.

5. The method of claim 1, further comprising:
    accessing a second unverified draft instructional block, authored by an operator, for the new digital procedure at the facility;

detecting a second set of language signals in the second unverified draft instructional block;
correlating a second equipment unit language signal, in the second set of language signals, with a second equipment unit located within the facility;
correlating a second action language signal, in the second set of language signals, with a second action prompt related to the second equipment unit;
correlating a second risk language signal, in the second set of language signals, with a second process risk associated with execution of the second action prompt with the second equipment unit;
identifying a second verified instructional block, in the set of verified instructional blocks contained in the instructional block library, as related to the unverified draft instructional block in response to:
the second verified instructional block comprising language signals associated with the second equipment unit and the second action prompt; and
detecting absence of the second risk language signal in the second verified instructional block;
inserting the second verified instructional block, in place of the second unverified draft instructional block, in the new digital procedure; and
flagging the new digital procedure for manual review by a supervisor overseeing digital procedures performed at the facility.

6. The system of claim 1, further comprising:
accessing a second unverified draft instructional block, authored by an operator, for the new digital procedure at the facility;
detecting a second set of language signals in the second unverified draft instructional block;
correlating a second equipment unit language signal, in the second set of language signals, with a second equipment unit located within the facility;
correlating a second action language signal, in the second set of language signals, with a second action prompt related to the second equipment unit;
correlating a second risk language signal, in the second set of language signals, with a second process risk associated with execution of the second action prompt with the second equipment unit;
identifying absence of language signals associated with the second equipment unit, the second action prompt, and the second process risk, in the set of verified instructional blocks contained in the instructional block library; and
in response to identifying the absence of language signals, flagging the new digital procedure for manual review by a supervisor overseeing digital procedures performed at the facility.

7. The system of claim 1:
wherein correlating the first equipment unit language signal, in the first set of language signals, with the first equipment unit located within the facility comprises:
accessing a first natural language processing model trained on equipment unit lexicon;
based on the first natural language processing model, identifying a first set of words describing the first equipment unit at the facility, in the first unverified draft instructional block;
normalizing the first set of words to a first equipment unit language concept; and
representing the first equipment unit language concept in the equipment unit signal;
wherein correlating the first action language signal, in the first set of language signals, with the first action prompt related to the first equipment unit comprises:
accessing a second natural language processing model trained on action and prompt lexicon;
based on the second natural language processing model, identifying a second set of words describing the first action prompt associated with the first equipment unit, in the first unverified draft instructional block;
normalizing the second set of words to a standard action language concept; and
representing the standard action language concept in the first action language signal; and
wherein correlating the first risk language signal, in the first set of language signals, with the first process risk associated with execution of the first action prompt with the first equipment unit comprises:
accessing a third natural language processing model trained on threat and instability lexicon;
based on the third natural language processing model, identifying a third set of words describing the first process risk associated with the action, in the first unverified draft instructional block;
normalizing the third set of words to a risk language concept; and
representing the risk language concept in the first risk language signal.

8. The method of claim 1:
wherein accessing the first unverified draft instructional block, authored by the operator, for the new digital procedure at the facility comprises accessing the first unverified draft instructional block comprising a first instruction in a set of formats comprising:
a text format comprising a textual description of a first process step in the new digital procedure;
an audio format comprising an audio recording of a voice describing the first process step; and
a visual format comprising a video clip depicting performance of the first process step; and
wherein detecting the first set of language signals in the first unverified draft instructional block comprises:
extracting a first sequence of words from the textual description of the first instruction in the text format;
extracting a first set of audio features from the audio recording of the first instruction in the audio format;
extracting a first set of visual features from the video clip of the first reference image in the visual format; and
detecting the first set of language signals in the first unverified draft instructional block based on the first sequence of words, the first set of audio features, and the first set of visual features.

9. The method of claim 8:
wherein correlating the first equipment unit language signal, in the first set of language signals, with the first equipment unit located within the facility comprises identifying presence of the first equipment unit depicted in the video clip based on the first set of visual features;
wherein correlating the first action language signal, in the first set of language signals, with the first action prompt related to the first equipment unit comprises interpreting the first sequence of words as describing the first action prompt related to the first equipment unit; and
wherein correlating the first risk language signal, in the first set of language signals, with the first process risk associated with execution of the first action prompt with the first equipment unit comprises identifying an audible alert corresponding to the first process risk in the audio recording based on the first set of audio features.

10. The method of claim 8:
wherein accessing the instructional block library containing the set of verified instructional blocks associated with approved digital procedures performed within the facility comprises:
  detecting a set of language signals in text content, audio content, and visual content contained within the instructional block, the set of language signals comprising:
    an equipment unit language signal corresponding to a particular equipment unit in the facility;
    an action language signal corresponding to an action prompt for the particular equipment unit; and
    a risk language signal corresponding to a process risk associated with execution of the action prompt for the particular equipment unit; and
  storing the set of language signals in a language signal tag, in a set of language signal tags, associated with the instructional block; and
wherein identifying the first verified instructional block, in the set of verified instructional blocks contained in the instructional block library, as analogous to the first unverified draft instructional block comprises:
  querying the set of language signal tags for a first language signal tag comprising the first equipment unit language signal, the first action language signal, and the first risk language signal; and
  in response to identifying the first language signal tag, retrieving the first verified instructional block associated with the first language signal tag, from the instructional block library.

11. The method of claim 1, wherein accessing the first unverified draft instructional block, authored by the operator, for the new digital procedure at the facility comprises:
  receiving selection of a particular verified instructional block, in the instructional block library, from the operator;
  loading the particular verified instructional block;
  receiving a modification to the particular verified instructional block from the operator; and
  in response to receiving the modification, storing the particular verified instructional block as the first unverified draft instructional block.

12. The method of claim 11, further comprising:
characterizing a scope of modification to the particular verified instructional block by the operator; and
in response to the scope of modification exceeding a threshold scope of modification:
  scanning the first unverified draft instructional block for the first set of language signals; and
  identifying the first verified instructional block, in the set of verified instructional blocks contained in the instructional block library, as analogous to the first unverified draft instructional block in response to the first verified instructional block comprising language signals associated with the first equipment unit, the first action prompt, and the first process risk.

13. The method of claim 1:
further comprising:
  accessing an electronic document representing the new digital procedure authored by the operator;
  identifying a sequence of steps specified in the electronic document; and
  for each step in the sequence of steps:
    extracting an instruction in a set of formats for the step;
    initializing an unverified draft instructional block, in a sequence of unverified draft instructional blocks, for the step; and
    populating the unverified draft instructional block with the instruction in the set of formats for the step;
wherein accessing a first unverified draft instructional block, authored by an operator, for the new digital procedure at the facility comprises accessing the first unverified draft instructional block from the sequence of unverified draft instructional blocks.

14. The method of claim 13, further comprising:
serving the sequence of unverified draft instructional blocks for the new digital procedure to an operator device associated with the operator for completion of a first instance of the new digital procedure at the facility by the operator;
at the operator device, recording a media file of completion of the first instance of the new digital procedure by the operator;
segmenting the media file into a set of media clips; and
populating each unverified draft instructional block, in the sequence of unverified draft instructional blocks, with a corresponding media clip in the set of media clips.

15. The method of claim 1, further comprising appending an audit trail for the new digital procedure comprising:
  an identifier of the operator authoring the new digital procedure;
  an identifier of a current revision of the first unverified draft instructional block in the new digital procedure; and
  the first verified instructional block analogous to the first unverified draft instructional block.

16. A method for modifying steps of a procedure comprising:
  accessing an instructional block library containing a set of verified instructional blocks associated with approved digital procedures performed within a facility;
  accessing a first unverified draft instructional block, authored by an operator, for a new digital procedure at the facility;
  detecting a first set of language signals in the first unverified draft instructional block;
  correlating a first equipment unit language signal, in the first set of language signals, with a first equipment unit located within the facility;
  correlating a first action language signal, in the first set of language signals, with a first action prompt related to the first equipment unit;
  correlating a first risk language signal, in the first set of language signals, with a first process risk associated with execution of the first action prompt with the first equipment unit;
  identifying a first verified instructional block, in the set of verified instructional blocks contained in the instructional block library, as related to the unverified draft instructional block in response to:
    the first verified instructional block comprising language signals associated with the first equipment unit and the first action prompt; and
    detecting absence of the first risk language signal in the first verified instructional block; and inserting the first verified instructional block, in place of the first unverified draft instructional block, in the new digital procedure.

17. The method of claim 16, wherein accessing the first unverified draft instructional block, authored by the operator, for the new digital procedure at the facility comprises:
receiving selection of a particular verified instructional block, in the instructional block library, from the operator;
loading the particular verified instructional block;
receiving, block from the operator, a modification to the particular verified instructional;
characterizing a scope of modification for the modification to the particular verified instructional block by the operator; and
in response to the scope of modification exceeding a threshold scope of modification, storing the particular verified instructional block as the first unverified draft instructional block.

18. The method of claim 16:
wherein accessing the first unverified draft instructional block, authored by the operator, for the new digital procedure at the facility comprises accessing the first unverified draft instructional block comprising a first instruction in a set of formats comprising:
a text format comprising a textual description of a first process step in the new digital procedure;
an audio format comprising an audio recording of a voice describing the first process step; and
a visual format comprising a video clip depicting performance of the first process step; and
wherein detecting the first set of language signals in the first unverified draft instructional block comprises detecting the first set of language signals in the textual description, the audio recording, and the video clip.

19. The method of claim 16:
wherein accessing the instructional block library containing the set of verified instructional blocks associated with approved digital procedures performed within the facility comprises:
detecting a set of language signals in text content, audio content, and visual content contained within the instructional block, the set of language signals comprising:
an equipment unit language signal corresponding to a particular equipment unit in the facility;
an action language signal corresponding to an action prompt for the particular equipment unit; and
a risk language signal corresponding to a process risk associated with execution of the action prompt for the particular equipment unit; and
storing the set of language signals in a language signal tag, in a set of language signal tags, associated with the instructional block; and
wherein identifying the first verified instructional block, in the set of verified instructional blocks contained in the instructional block library, as related to the first unverified draft instructional block comprises:
querying the set of language signal tags for a first language signal tag comprising the first equipment unit language signal and the first action language signal; and
in response to detecting absence of the risk language signal in the first language signal tag, retrieving the first verified instructional block associated with the first language signal tag, from the instructional block library.

* * * * *